(12) United States Patent
Coulonvaux et al.

(10) Patent No.: US 11,007,462 B2
(45) Date of Patent: May 18, 2021

(54) AIR CLEANER; REPLACEABLE FILTER CARTRIDGES; AND, METHODS

(71) Applicant: Donaldson Company, Inc., Minneapolis, MN (US)

(72) Inventors: Paul Coulonvaux, Ramillies (BE); Johnny Craessaerts, Huldenberg (BE)

(73) Assignee: Donaldson Company, Inc., Minneapolis, MN (US)

( * ) Notice: Subject to any disclaimer, the term of this patent is extended or adjusted under 35 U.S.C. 154(b) by 457 days.

(21) Appl. No.: 15/450,625

(22) Filed: Mar. 6, 2017

(65) Prior Publication Data

US 2017/0266598 A1   Sep. 21, 2017

Related U.S. Application Data

(63) Continuation of application No. 14/336,268, filed on Jul. 21, 2014, now Pat. No. 9,586,166, which is a
(Continued)

(51) Int. Cl.
*B01D 45/00* (2006.01)
*B01D 46/00* (2006.01)
(Continued)

(52) U.S. Cl.
CPC ..... *B01D 46/0005* (2013.01); *B01D 46/0001* (2013.01); *B01D 46/0024* (2013.01);
(Continued)

(58) Field of Classification Search
CPC ............ B01D 46/0005; B01D 46/0001; B01D 46/521; B01D 46/2414; B01D 46/0046;
(Continued)

(56) References Cited

U.S. PATENT DOCUMENTS 2,771,156 A   11/1956   Kasten et al.
2,887,177 A    2/1958   Mund et al.
(Continued)

FOREIGN PATENT DOCUMENTS

BE   1011567 A3   11/1989
DE   28 19 198    11/1978
(Continued)

OTHER PUBLICATIONS

International Search Report and Written Opinion corresponding to PCT/US2007/021402 dated Jun. 6, 2008.
(Continued)

*Primary Examiner* — Dung H Bui
(74) *Attorney, Agent, or Firm* — Merchant & Gould P.C.

(57) ABSTRACT

An air cleaner assembly, a main filter element, a safety element, combinations and methods for servicing an air cleaner assembly are provided according to the present invention. The air cleaner assembly includes an air cleaner housing and a main filter element. The air cleaner housing includes a safety liner that supports the main filter element, and can be configured to help reduce the tendency of the main filter element to rotate during use of the air cleaner assembly. A safety element having two open ends, for use with such an assembly is described.

19 Claims, 24 Drawing Sheets

Related U.S. Application Data continuation of application No. 13/617,307, filed on Sep. 14, 2012, now Pat. No. 8,784,523, which is a continuation of application No. 12/311,594, filed as application No. PCT/US2007/021402 on Oct. 8, 2007, now Pat. No. 8,273,143.

(60) Provisional application No. 60/963,068, filed on Aug. 1, 2007, provisional application No. 60/849,906, filed on Oct. 6, 2006.

(51) Int. Cl.
  *B01D 46/24* (2006.01)
  *B01D 46/52* (2006.01)
  *F02M 35/024* (2006.01)

(52) U.S. Cl.
  CPC ..... *B01D 46/0046* (2013.01); *B01D 46/2414* (2013.01); *B01D 46/521* (2013.01); *F02M 35/024* (2013.01); *B01D 2265/022* (2013.01); *B01D 2265/028* (2013.01); *B01D 2265/06* (2013.01); *B01D 2271/027* (2013.01); *Y10T 29/49826* (2015.01)

(58) Field of Classification Search
  CPC .......... B01D 46/0024; B01D 2271/027; B01D 2265/06; B01D 2265/028; B01D 2265/022; F02M 35/024; Y10T 29/49826
  See application file for complete search history.

(56) References Cited

U.S. PATENT DOCUMENTS

| | | |
|---|---|---|
| 2,945,559 A | 3/1959 | Buckman |
| 3,019,854 A | 10/1959 | O'Bryant |
| 3,002,870 A | 10/1961 | Belgarde et al. |
| 3,025,963 A | 3/1962 | Bauer |
| 3,048,959 A | 8/1962 | Lowther |
| 3,078,650 A | 2/1963 | Anderson et al. |
| 3,160,488 A | 12/1964 | Wilber |
| 3,169,844 A | 2/1965 | Young |
| 3,209,917 A | 10/1965 | Yelinek |
| 3,228,527 A * | 1/1966 | Mcpherson .......... B01D 17/045 210/307 |
| 3,290,870 A | 12/1966 | Jensen |
| 3,342,021 A | 9/1967 | Yelinek et al. |
| 3,342,335 A | 9/1967 | Gamundi et al. |
| 3,354,012 A | 11/1967 | Forman et al. |
| 3,357,163 A | 12/1967 | Burger et al. |
| 3,413,780 A | 12/1968 | Amlott et al. |
| 3,423,909 A | 1/1969 | Bennett et al. |
| 3,452,519 A | 7/1969 | Bianchetta |
| 3,488,928 A | 1/1970 | Tarala |
| 3,584,439 A | 6/1971 | Gronholz |
| 3,616,618 A | 11/1971 | Gronholz et al. |
| 3,672,130 A | 6/1972 | Sullivan et al. |
| 3,676,242 A | 7/1972 | Prentice |
| 3,695,437 A | 10/1972 | Shaltis |
| 3,710,560 A | 1/1973 | Maddocks |
| 3,716,436 A | 2/1973 | Pall et al. |
| 3,807,150 A | 4/1974 | Maracle |
| 3,841,953 A | 10/1974 | Lohkamp et al. |
| 3,878,014 A | 4/1975 | Melead |
| 4,006,000 A | 2/1977 | Tortorici et al. |
| 4,036,616 A | 7/1977 | Bryns |
| 4,062,781 A | 12/1977 | Strauss et al. |
| 4,135,899 A | 1/1979 | Gauer |
| 4,158,449 A | 6/1979 | Sun et al. |
| 4,159,197 A | 6/1979 | Schuler et al. |
| 4,162,906 A | 7/1979 | Sullivan et al. |
| 4,211,543 A | 7/1980 | Tokar et al. |
| 4,222,755 A | 9/1980 | Grotto |
| 4,227,898 A | 10/1980 | Kamekawa et al. |
| 4,235,611 A | 11/1980 | Brownell |
| 4,303,426 A | 12/1981 | Battis |
| 4,312,651 A | 1/1982 | Esaki et al. |
| 4,314,832 A | 2/1982 | Fox |
| 4,349,363 A | 9/1982 | Patel et al. |
| 4,350,509 A | 9/1982 | Alseth et al. |
| 4,364,751 A | 12/1982 | Copley |
| 4,402,830 A | 9/1983 | Pall |
| 4,410,427 A | 10/1983 | Wydeven |
| 4,452,616 A | 6/1984 | Gillingham et al. |
| 4,488,889 A | 12/1984 | McCarroll |
| 4,491,460 A | 1/1985 | Tokar |
| 4,498,915 A | 2/1985 | Witchell |
| 4,537,608 A | 8/1985 | Koslow |
| 4,552,750 A | 11/1985 | van der Wal et al. |
| 4,588,426 A | 5/1986 | Virgille et al. |
| 4,589,983 A | 5/1986 | Wydevan |
| 4,600,420 A | 7/1986 | Wydeven et al. |
| 4,609,465 A | 9/1986 | Miller |
| 4,720,292 A | 1/1988 | Engel et al. |
| 4,728,423 A | 3/1988 | Kuwajima |
| 4,764,191 A | 8/1988 | Morelli |
| 4,801,383 A | 1/1989 | Hoffmann et al. |
| 4,818,261 A | 4/1989 | Beckon |
| 4,838,901 A | 6/1989 | Schmidt et al. |
| 4,925,469 A | 5/1990 | Clement et al. |
| 4,925,561 A | 5/1990 | Ishii et al. |
| 4,950,317 A | 8/1990 | Dottermans |
| 4,963,170 A | 10/1990 | Weber et al. |
| 5,030,264 A | 7/1991 | Klotz et al. |
| 5,045,192 A | 9/1991 | Terhune |
| 5,049,326 A | 9/1991 | Matsumoto et al. |
| 5,064,458 A | 11/1991 | Machado |
| 5,071,456 A | 12/1991 | Binder et al. |
| 5,082,476 A | 1/1992 | Kahlbaugh et al. |
| 5,112,417 A | 5/1992 | Sayles |
| 5,116,499 A | 5/1992 | Deibel |
| 5,118,417 A | 6/1992 | Deibel |
| 5,120,337 A | 6/1992 | Benzler et al. |
| 5,125,941 A | 6/1992 | Ernst et al. |
| 5,137,557 A | 8/1992 | Behrendt et al. |
| 5,160,519 A | 11/1992 | Svensson et al. |
| 5,167,683 A | 12/1992 | Behrendt et al. |
| 5,211,846 A | 5/1993 | Kott et al. |
| 5,213,596 A | 5/1993 | Kume et al. |
| 5,222,488 A | 6/1993 | Forsgren |
| 5,238,476 A | 8/1993 | Svensson et al. |
| 5,250,179 A | 10/1993 | Spearman |
| 5,277,157 A | 1/1994 | Teich |
| 5,290,445 A | 3/1994 | Buttery |
| 5,342,511 A | 8/1994 | Brown |
| 5,350,515 A | 9/1994 | Stark et al. |
| 5,401,285 A | 3/1995 | Gillingham et al. |
| 5,415,677 A | 5/1995 | Ager et al. |
| 5,431,168 A | 7/1995 | Webster, Jr. |
| 5,435,870 A | 7/1995 | Takagaki et al. |
| 5,442,721 A | 8/1995 | Kalada et al. |
| 5,445,241 A | 8/1995 | Nakamura et al. |
| 5,484,466 A | 1/1996 | Brown et al. |
| 5,487,767 A | 1/1996 | Brown |
| 5,494,497 A | 2/1996 | Lee |
| 5,543,007 A | 8/1996 | Takagaki et al. |
| 5,545,241 A | 8/1996 | Vanderauwera et al. |
| 5,547,480 A | 8/1996 | Coulonvaux |
| 5,556,440 A | 9/1996 | Mullins et al. |
| 5,562,825 A | 10/1996 | Yamada et al. |
| 5,575,826 A | 11/1996 | Gillingham et al. |
| 5,601,717 A | 2/1997 | Villette et al. |
| 5,605,555 A | 2/1997 | Patel et al. |
| 5,605,625 A | 2/1997 | Mills |
| 5,611,922 A | 3/1997 | Stene |
| 5,613,992 A | 3/1997 | Engel |
| 5,632,791 A | 5/1997 | Oussoren et al. |
| 5,645,718 A | 7/1997 | Hardison et al. |
| 5,683,479 A | 11/1997 | Gillingham et al. |
| 5,683,660 A | 11/1997 | Wirth et al. |
| 5,685,985 A | 11/1997 | Brown et al. |
| 5,690,712 A | 11/1997 | Engel |
| 5,700,304 A | 12/1997 | Foo |
| 5,720,788 A | 2/1998 | Puckett et al. |

(56) References Cited

U.S. PATENT DOCUMENTS

| | | |
|---|---|---|
| 5,720,790 A | 2/1998 | Kometani et al. |
| 5,730,768 A | 3/1998 | Kaminaga et al. |
| 5,730,769 A | 3/1998 | Dungs et al. |
| 5,736,040 A | 4/1998 | Duerrstein et al. |
| 5,740,774 A | 4/1998 | Kennedy |
| 5,741,421 A | 4/1998 | Erdmannsdoerfer et al. |
| 5,753,117 A | 5/1998 | Jiang |
| 5,755,842 A | 5/1998 | Patel et al. |
| 5,755,844 A | 5/1998 | Arai et al. |
| 5,772,883 A | 6/1998 | Rothman et al. |
| D396,098 S | 7/1998 | Gillingham et al. |
| 5,775,842 A | 7/1998 | Osborne |
| 5,792,247 A | 8/1998 | Gillingham et al. |
| D398,046 S | 9/1998 | Gillingham et al. |
| 5,800,581 A | 9/1998 | Gielink et al. |
| D399,944 S | 10/1998 | Gillingham et al. |
| 5,820,646 A | 10/1998 | Gillingham et al. |
| D401,306 S | 11/1998 | Ward |
| 5,853,439 A | 12/1998 | Gieseke et al. |
| 5,863,313 A | 1/1999 | Coulonvaux |
| 5,865,863 A | 2/1999 | DeSousa et al. |
| 5,882,367 A | 3/1999 | Morgan et al. |
| 5,893,937 A | 4/1999 | Moessinger |
| 5,895,574 A | 4/1999 | Friedmann et al. |
| 5,897,676 A | 4/1999 | Engel et al. |
| 5,902,364 A | 5/1999 | Tokar et al. |
| 5,916,435 A | 6/1999 | Spearman et al. |
| 5,919,279 A | 7/1999 | Merritt et al. |
| 5,921,982 A | 7/1999 | Lesh et al. |
| 5,938,804 A | 8/1999 | Engel et al. |
| D414,544 S | 9/1999 | Ward et al. |
| 5,951,729 A | 9/1999 | Ernst et al. |
| 5,972,063 A | 10/1999 | Dudrey et al. |
| D416,308 S | 11/1999 | Ward et al. |
| D417,268 S | 11/1999 | Gillingham |
| 5,984,109 A | 11/1999 | Kanwar et al. |
| 6,004,366 A | 12/1999 | Engel et al. |
| 6,039,778 A | 3/2000 | Coulonvaux |
| 6,048,386 A | 4/2000 | Gillingham et al. |
| 6,051,042 A | 4/2000 | Coulonvaux |
| D425,189 S | 5/2000 | Gillingham et al. |
| D428,128 S | 7/2000 | Gillingham et al. |
| 6,090,177 A | 7/2000 | Moessinger et al. |
| 6,096,208 A | 8/2000 | Connelly et al. |
| 6,099,606 A | 8/2000 | Miller et al. |
| 6,149,700 A | 11/2000 | Morgan et al. |
| 6,152,979 A | 11/2000 | Cappuyns |
| 6,171,275 B1 | 1/2001 | Webster, Jr. |
| 6,179,890 B1 | 1/2001 | Ramos et al. |
| D437,401 S | 2/2001 | Ramos et al. |
| 6,190,432 B1 | 2/2001 | Gieseke et al. |
| 6,210,469 B1 | 4/2001 | Tokar |
| 6,221,122 B1 | 4/2001 | Gieseke et al. |
| 6,231,630 B1 | 5/2001 | Ernst et al. |
| 6,235,195 B1 | 5/2001 | Tokar |
| 6,258,145 B1 | 7/2001 | Engel et al. |
| 6,261,334 B1 | 7/2001 | Morgan et al. |
| 6,290,739 B1 | 9/2001 | Gieseke et al. |
| 6,299,661 B1 | 10/2001 | Bloomer |
| 6,306,193 B1 | 10/2001 | Morgan et al. |
| 6,322,602 B2 | 11/2001 | Engel et al. |
| 6,348,084 B1 * | 2/2002 | Gieseke ............ B01D 46/0002 55/357 |
| 6,348,085 B1 | 2/2002 | Tokar et al. |
| 6,350,291 B1 | 2/2002 | Gieseke et al. |
| 6,350,296 B1 | 2/2002 | Warner |
| 6,368,374 B1 | 4/2002 | Tokar et al. |
| 6,383,244 B1 | 5/2002 | Wake et al. |
| 6,387,162 B1 | 5/2002 | Kosmider et al. |
| 6,398,832 B2 | 6/2002 | Morgan et al. |
| 6,402,798 B1 | 6/2002 | Kallsen et al. |
| 6,413,289 B2 | 7/2002 | Engel et al. |
| 6,416,561 B1 | 7/2002 | Kallsen et al. |
| 6,419,718 B1 | 7/2002 | Klug et al. |
| 6,436,162 B1 | 8/2002 | Wake et al. |
| 6,447,567 B1 * | 9/2002 | Ehrenberg ............ F02M 35/024 55/498 |
| 6,478,958 B1 * | 11/2002 | Beard .................... B01D 27/02 210/323.2 |
| 6,485,535 B1 | 11/2002 | Linnersten et al. |
| D467,654 S | 12/2002 | Klug et al. |
| 6,517,598 B2 | 2/2003 | Anderson et al. |
| 6,521,009 B2 | 2/2003 | Engel et al. |
| D471,623 S | 3/2003 | Gieseke et al. |
| 6,540,806 B2 | 4/2003 | Reinhold |
| 6,547,857 B2 | 4/2003 | Gieseke et al. |
| D475,129 S | 5/2003 | Ward et al. |
| 6,558,453 B2 | 5/2003 | Sepke et al. |
| 6,572,667 B1 | 6/2003 | Greif et al. |
| D477,659 S | 7/2003 | Gieseke et al. |
| 6,585,792 B2 | 7/2003 | Schneider et al. |
| 6,585,838 B2 | 7/2003 | Mullins et al. |
| 6,598,580 B2 | 7/2003 | Baumann et al. |
| 6,599,342 B2 | 7/2003 | Andress et al. |
| 6,599,344 B2 | 7/2003 | Tokar et al. |
| 6,602,308 B1 | 8/2003 | Carle et al. |
| 6,610,117 B2 | 8/2003 | Gieseke et al. |
| 6,610,126 B2 | 8/2003 | Xu et al. |
| D481,101 S | 10/2003 | Boehrs |
| 6,652,614 B2 | 11/2003 | Gieseke et al. |
| D483,459 S | 12/2003 | DeWit et al. |
| D485,339 S | 1/2004 | Klug et al. |
| 6,673,136 B2 | 1/2004 | Gilingham et al. |
| 6,676,721 B1 | 1/2004 | Gillingham et al. |
| 6,685,829 B1 * | 2/2004 | Baumann ............... B01D 29/21 210/232 |
| 6,736,874 B2 | 5/2004 | Rieger |
| 6,743,317 B2 | 6/2004 | Wydeven |
| 6,746,518 B2 | 6/2004 | Gieseke et al. |
| 6,752,924 B2 | 6/2004 | Gustafson et al. |
| 6,811,694 B2 | 11/2004 | Jainek |
| 6,837,920 B2 | 1/2005 | Gieseke et al. |
| 6,872,237 B2 | 3/2005 | Gillingham et al. |
| 6,878,190 B1 | 4/2005 | Xu et al. |
| 6,908,494 B2 | 6/2005 | Gillingham et al. |
| 6,936,084 B2 | 8/2005 | Schlensker et al. |
| 6,966,940 B2 | 11/2005 | Krisko et al. |
| D513,314 S | 12/2005 | Iddings et al. |
| 6,984,319 B2 | 1/2006 | Merritt et al. |
| 6,986,805 B2 | 1/2006 | Gieseke et al. |
| 7,001,450 B2 | 2/2006 | Gieseke et al. |
| 7,004,986 B2 | 2/2006 | Kopec et al. |
| 7,070,642 B2 * | 7/2006 | Scott ................ B01D 46/0001 55/498 |
| 7,081,145 B2 * | 7/2006 | Gieseke ............... B01D 46/001 123/198 E |
| 7,115,156 B2 | 10/2006 | Schaerlund et al. |
| 7,179,380 B2 * | 2/2007 | Merritt .................. B01D 29/15 210/254 |
| 7,211,124 B2 | 5/2007 | Gieseke et al. |
| 7,252,704 B2 | 8/2007 | Tokar et al. |
| 7,291,198 B2 | 11/2007 | Gieseke et al. |
| 7,329,326 B2 | 2/2008 | Wagner et al. |
| 7,332,009 B2 | 2/2008 | Casey et al. |
| 7,351,270 B2 | 4/2008 | Engelland et al. |
| 7,361,271 B2 | 4/2008 | Merritt et al. |
| 7,374,595 B2 | 5/2008 | Gierer |
| 7,413,588 B2 | 8/2008 | Holzmann et al. |
| 7,520,913 B2 | 4/2009 | Mills et al. |
| 7,524,349 B2 | 4/2009 | Schrage et al. |
| 7,537,631 B2 | 5/2009 | Scott et al. |
| 7,572,310 B2 | 8/2009 | Gieseke et al. |
| 7,641,708 B2 | 1/2010 | Kosmider et al. |
| 7,655,074 B2 | 2/2010 | Nepsund et al. |
| 7,662,203 B2 | 2/2010 | Scott et al. |
| 7,662,216 B1 * | 2/2010 | Terres ............... B01D 46/0005 55/482 |
| 7,682,416 B2 | 3/2010 | Engelland et al. |
| 7,713,321 B2 | 5/2010 | Kuempel et al. |
| 7,736,410 B2 | 6/2010 | Kuempel et al. |
| RE41,713 E | 9/2010 | Gunderson et al. |
| 7,837,754 B2 * | 11/2010 | Johnson ............... B01D 29/21 55/482 |

(56) References Cited

U.S. PATENT DOCUMENTS

| | | | |
|---|---|---|---|
| RE42,174 E | 3/2011 | Gunderson et al. | |
| 7,972,404 B2 | 7/2011 | Kuempel et al. | |
| 7,981,183 B2 | 7/2011 | Nepsund et al. | |
| 7,981,186 B2 | 7/2011 | Schrage et al. | |
| 7,981,187 B2 | 7/2011 | Gieseke et al. | |
| 7,988,757 B2 | 8/2011 | Scott et al. | |
| 7,993,422 B2 | 8/2011 | Krisko et al. | |
| 8,012,233 B2 | 9/2011 | Kuempel et al. | |
| 8,034,145 B2 | 10/2011 | Boehrs et al. | |
| 8,038,756 B2 | 10/2011 | Iddings et al. | |
| 8,066,791 B2 | 11/2011 | Baseotto et al. | |
| 8,128,724 B2 | 3/2012 | Mills et al. | |
| 8,142,533 B2 | 3/2012 | Gillenberg et al. | |
| 8,147,576 B2 | 4/2012 | Gillenberg et al. | |
| 8,147,582 B2 | 4/2012 | Engelland et al. | |
| 8,152,876 B2 | 4/2012 | Gillenberg et al. | |
| 8,163,056 B2 | 4/2012 | Coulonvaux et al. | |
| 8,182,569 B2 | 5/2012 | Casey et al. | |
| 8,216,334 B2 | 7/2012 | Nelson et al. | |
| 8,216,335 B2 | 7/2012 | Scott et al. | |
| 8,241,384 B2 | 8/2012 | Schrage et al. | |
| 8,273,143 B2 | 9/2012 | Coulonvaux et al. | |
| 8,277,532 B2 | 10/2012 | Reichter et al. | |
| 8,292,983 B2 | 10/2012 | Reichter et al. | |
| 8,292,984 B2 | 10/2012 | Baseotto et al. | |
| 8,382,875 B2 | 2/2013 | Engelland et al. | |
| 8,382,876 B2 | 2/2013 | Widerski et al. | |
| 8,394,166 B2 | 3/2013 | Scott et al. | |
| 8,409,316 B2 | 4/2013 | Nelson et al. | |
| 8,414,675 B2 | 4/2013 | Iddings et al. | |
| 8,414,676 B2 | 4/2013 | Hiner et al. | |
| 8,460,425 B2 | 6/2013 | Scott et al. | |
| 8,480,778 B2 | 7/2013 | Baseotto et al. | |
| 8,518,141 B2 | 8/2013 | Schrage et al. | |
| 8,545,588 B2 | 10/2013 | Iddings et al. | |
| 8,562,707 B2 | 10/2013 | Nepsund et al. | |
| 8,574,333 B2 | 11/2013 | Nelson | |
| 8,636,820 B2 | 1/2014 | Reichter et al. | |
| 8,641,795 B2 | 2/2014 | Coulonvaux et al. | |
| 8,702,831 B2 | 4/2014 | Scott et al. | |
| 8,747,512 B2 | 6/2014 | Mills et al. | |
| 8,784,523 B2 | 7/2014 | Coulonvaux et al. | |
| 8,814,973 B2 | 8/2014 | Baseotto et al. | |
| 8,852,309 B2 | 10/2014 | Scott et al. | |
| 8,864,866 B2 | 10/2014 | Osendorf et al. | |
| 8,916,044 B2 | 12/2014 | Rapin | |
| 8,920,530 B2 | 12/2014 | Ruhland et al. | |
| 9,039,802 B2 | 5/2015 | Scott et al. | |
| 9,067,161 B2 | 6/2015 | Campbell et al. | |
| 9,221,004 B2 | 12/2015 | Iddings et al. | |
| 9,238,189 B2 | 1/2016 | Baseotto et al. | |
| 9,346,001 B2 | 5/2016 | Kato et al. | |
| 9,353,657 B2 | 5/2016 | Scott et al. | |
| 9,586,166 B2 | 3/2017 | Coulonvaux et al. | |
| 9,718,019 B2 | 8/2017 | Baseotto et al. | |
| 9,889,398 B2 | 2/2018 | Campbell et al. | |
| 10,029,199 B2 | 7/2018 | Scott et al. | |
| 10,124,285 B2 | 11/2018 | Baseotto et al. | |
| 10,245,544 B2 | 4/2019 | Iddings et al. | |
| 10,307,704 B2 | 6/2019 | Scott et al. | |
| 10,625,191 B2 | 4/2020 | Campbell et al. | |
| 10,710,017 B2 | 7/2020 | Baseotto et al. | |
| 10,717,034 B2 | 7/2020 | Scott et al. | |
| 2002/0014058 A1 | 2/2002 | Engel et al. | |
| 2002/0040569 A1* | 4/2002 | Reinhold | B01D 29/21 55/498 |
| 2002/0112458 A1 | 8/2002 | Schneider et al. | |
| 2002/0112459 A1 | 8/2002 | Andress et al. | |
| 2002/0184864 A1 | 12/2002 | Bishop et al. | |
| 2003/0051455 A1 | 3/2003 | Gieseke et al. | |
| 2003/0146149 A1 | 8/2003 | Binder et al. | |
| 2003/0226793 A1* | 12/2003 | Merritt | B01D 29/15 210/206 |
| 2003/0226795 A1 | 12/2003 | Merritt | |
| 2003/0226800 A1 | 12/2003 | Brown | |
| 2004/0020177 A1 | 2/2004 | Ota et al. | |
| 2004/0050772 A1* | 3/2004 | Winter | B01D 27/005 210/483 |
| 2004/0134171 A1 | 7/2004 | Scott et al. | |
| 2004/0216434 A1* | 11/2004 | Gunderson | B01D 29/21 55/498 |
| 2004/0261383 A1 | 12/2004 | Schaerlund et al. | |
| 2006/0086075 A1* | 4/2006 | Scott | B01D 46/0001 55/498 |
| 2006/0288674 A1* | 12/2006 | Amesoeder | B01D 46/525 55/486 |
| 2007/0240394 A1* | 10/2007 | Ehrenberg | B01D 46/0001 55/498 |
| 2008/0190082 A1 | 8/2008 | Scott et al. | |
| 2008/0257161 A1 | 10/2008 | Read | |
| 2008/0307759 A1 | 12/2008 | Reichter et al. | |
| 2009/0049814 A1 | 2/2009 | Baseotto et al. | |
| 2009/0094951 A1 | 4/2009 | Baseotto et al. | |
| 2009/0100813 A1 | 4/2009 | Iddings et al. | |
| 2009/0145095 A1* | 6/2009 | Juliar | B01D 46/0046 55/359 |
| 2009/0200221 A1* | 8/2009 | Hacker | B01D 29/21 210/232 |
| 2009/0211450 A1* | 8/2009 | Mosset | B01D 46/0001 95/273 |
| 2009/0217632 A1 | 9/2009 | Coulonvaux et al. | |
| 2010/0146917 A1 | 6/2010 | Coulonvaux et al. | |
| 2010/0146919 A1 | 6/2010 | Nelson et al. | |
| 2010/0146920 A1 | 6/2010 | Iddings et al. | |
| 2010/0147381 A1 | 6/2010 | Haney et al. | |
| 2011/0017657 A1 | 1/2011 | Jokschas et al. | |
| 2011/0094197 A1 | 4/2011 | Ruhland et al. | |
| 2011/0173937 A1 | 7/2011 | Nelson | |
| 2011/0308212 A1 | 12/2011 | Ruhland et al. | |
| 2014/0059986 A1 | 3/2014 | Kaufmann et al. | |
| 2014/0102058 A1 | 4/2014 | Kaufmann et al. | |

FOREIGN PATENT DOCUMENTS

| | | |
|---|---|---|
| DE | 29 47 655 | 6/1980 |
| DE | 42 41 586 | 1/1994 |
| DE | 195 19 438 | 11/1996 |
| DE | 198 49 089 A1 | 4/2000 |
| DE | 100 10 507 | 9/2001 |
| DE | 100 20 538 | 10/2001 |
| EP | 0 230 991 A2 | 8/1987 |
| EP | 0 329 659 B1 | 8/1989 |
| EP | 0 480 991 B1 | 4/1992 |
| EP | 0 562 502 | 9/1993 |
| EP | 1 101 928 | 5/2001 |
| EP | 1 128 891 | 2/2003 |
| EP | 1 123 460 B1 | 8/2003 |
| EP | 1 174 171 B1 | 8/2004 |
| EP | 1 357 997 B1 | 9/2006 |
| EP | 1 754 525 | 2/2007 |
| FR | 2 665 217 | 1/1992 |
| GB | 1 125 335 | 4/1919 |
| GB | 1 124 735 | 8/1968 |
| GB | 1 499 922 | 2/1978 |
| GB | 1 511 904 | 5/1978 |
| GB | 1 602 399 | 5/1978 |
| GB | 2 110 110 | 6/1983 |
| GB | 2 119 674 | 11/1983 |
| GB | 2 163 368 | 2/1986 |
| SU | 868082 | 9/1981 |
| WO | 79/00978 | 11/1979 |
| WO | WO 89/01818 | 3/1989 |
| WO | WO 91/00425 | 1/1991 |
| WO | WO 98/11977 | 3/1998 |
| WO | WO 99/42719 | 8/1999 |
| WO | WO 2000/ 23166 | 4/2000 |
| WO | WO 01/91884 | 12/2001 |
| WO | WO 2002/45819 | 6/2002 |
| WO | WO 02/078816 | 10/2002 |
| WO | WO 2004/039476 | 5/2004 |

(56) References Cited

FOREIGN PATENT DOCUMENTS

WO    WO 2005/092475    10/2005
WO    WO 2006/026241    3/2006

OTHER PUBLICATIONS

European search report and written opinion corresponding to EP 13163323 (M&G 758.2146EPD1) dated Oct. 22, 2013.
Declaration with Exhibits of Daniel E. Adamek, dated Sep. 7, 2016.
Exhibit A, Pending claims of U.S. Appl. No. 15/166,861 dated Jun. 14, 2017.
Exhibit B, Pending claims of U.S. Appl. No. 14/717,251 dated Jun. 14, 2017.
Exhibit C, Pending claims of U.S. Appl. No. 14/467,222 dated Jun. 14, 2017.
Exhibit D, Pending claims of U.S. Appl. No. 14/996,491 dated Jun. 14, 2017.
Exhibit E, Pending claims of U.S. Appl. No. 14/977,930 dated Jun. 14, 2017.
Exhibit F, Pending claims of U.S. Appl. No. 14/718,249 dated Jun. 14, 2017.
Exhibit G, Pending claims of U.S. Appl. No. 14/646,532 dated Jun. 14, 2017.
English translation of Grounds of Opposition, dated Feb. 13, 2015.
Response to Grounds of Opposition, Aug. 4, 2015.
Response and Summons to Oral Hearing of Apr. 12, 2017.
Minutes of Oral Hearing of Jul. 27, 2017.
Interlocutory Decision of Jul. 27, 2017.
Exhibit A, Pending claims of U.S. Appl. No. 16/931,658 dated Aug. 19, 2020.
Exhibit B, Pending claims of U.S. Appl. No. 16/186,770 dated Jun. Aug. 19, 2020.
Exhibit C, Pending claims of U.S. Appl. No. 16/291,164 dated Aug. 19, 2020.
Exhibit D, Pending claims of U.S. Appl. No. 16/851,244 dated Aug. 19, 2020.

\* cited by examiner

US 11,007,462 B2

AIR CLEANER; REPLACEABLE FILTER CARTRIDGES; AND, METHODS

CROSS REFERENCE RELATED APPLICATION

This application is a continuation application of U.S. Ser. No. 14/336,268, filed Jul. 21, 2014, which issued as U.S. Pat. No. 9,586,166 on Mar. 7, 2017. U.S. Ser. No. 14/336,268 is a continuation of U.S. Ser. No. 13/617,307, filed Sep. 14, 2012, which issued as U.S. Pat. No. 8,784,523. U.S. Ser. No. 13/617,307 is a continuation of U.S. Ser. No. 12/311,594 filed Apr. 3, 2009, which has issued as U.S. Pat. No. 8,273,143, and was a U.S. filing of PCT application PCT/US2007/021402, filed Oct. 8, 2007; the PCT application claiming priority to U.S. Ser. No. 60/849,906, filed Oct. 6, 2006 and U.S. Ser. No. 60/963,068, filed Aug. 1, 2007. The complete disclosures of U.S. Ser. No. 14/336,268; U.S. Ser. No. 13/617,307; U.S. Ser. No. 12/311,594; PCT/US2007/021402; U.S. Ser. No. 60/849,906; and, U.S. Ser. No. 60/963,068 are incorporated herein by reference. A claim of priority is made to each of U.S. Ser. No. 14/336,268; U.S. Ser. No. 13/617,307; U.S. Ser. No. 12/311,594; PCT/US2007/021402; U.S. Ser. No. 60/849,906; and, U.S. Ser. No. 60/963,068 is made to the extent appropriate.

FIELD OF THE DISCLOSURE

The present disclosure concerns air cleaners with removable and replaceable (i.e., serviceable) filter cartridges. Methods of servicing are also provided.

BACKGROUND

Air filtering is used in a variety of arrangements. A typical application is as an air cleaner for intake air to internal combustion engines. After a period of use, filter media within the cleaner requires servicing, either through cleaning or complete replacement. Typically, for an air cleaner used within internal combustion engines such as on a vehicle, filter media is contained in a removable or replaceable (for example, serviceable) component, element or cartridge. Examples are shown in U.S. Pat. Nos. 4,211,543; 4,135,899; 3,672,130; 5,445,241; 5,700,304; 6,051,042; 6,039,778; 5,547,480; 5,755,842; and 5,800,581; and PCT Publication WO 89/01818 and WO 06/026241; the complete disclosures of all these references being incorporated herein by reference.

Improvements in filter arrangements relating to assembly and use, are desirable.

SUMMARY

An air cleaner assembly, a main filter element, and a method for servicing an air cleaner assembly are provided according to the present invention. The air cleaner assembly includes an air cleaner housing and a main filter element. The air cleaner housing includes a safety liner having a closed end cap that supports the main filter element.

DETAILED DESCRIPTION

Figure 1:
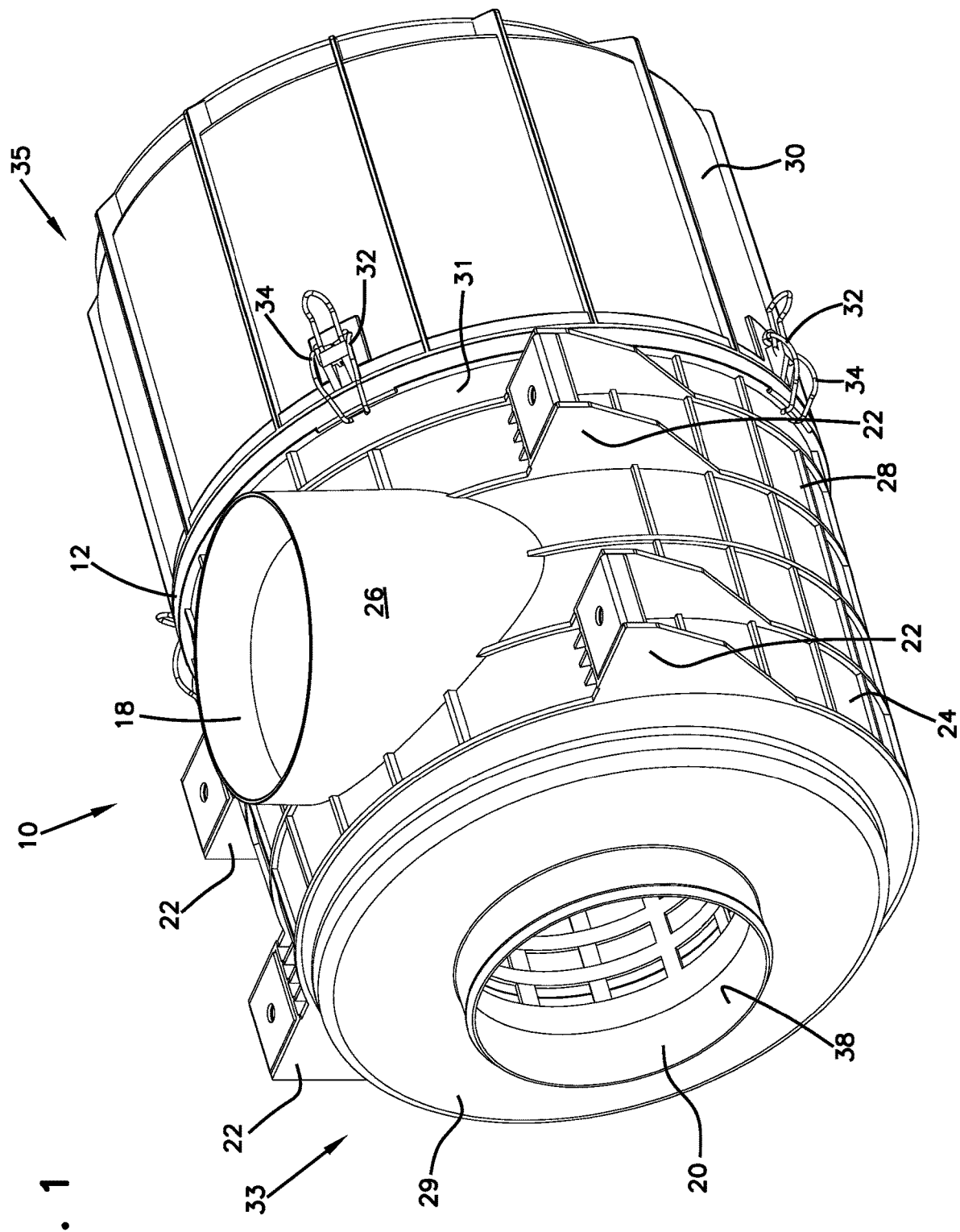
FIG. 1 is a side, perspective view of a main cleaner assembly according to the present disclosure.
Figure 11:
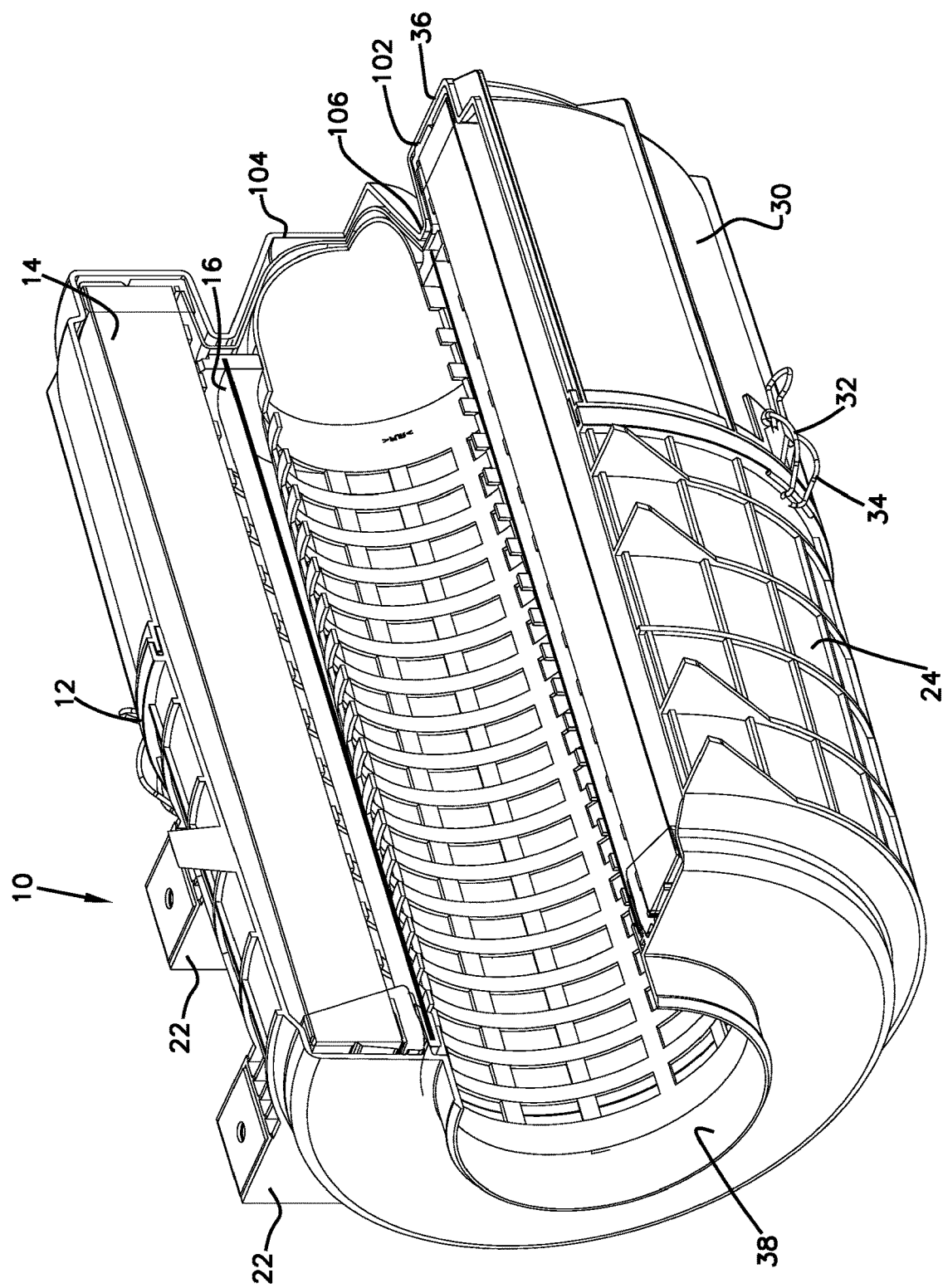
FIG. 11 is a cutaway, perspective view of the assembly of FIG. 1.
Figure 12:
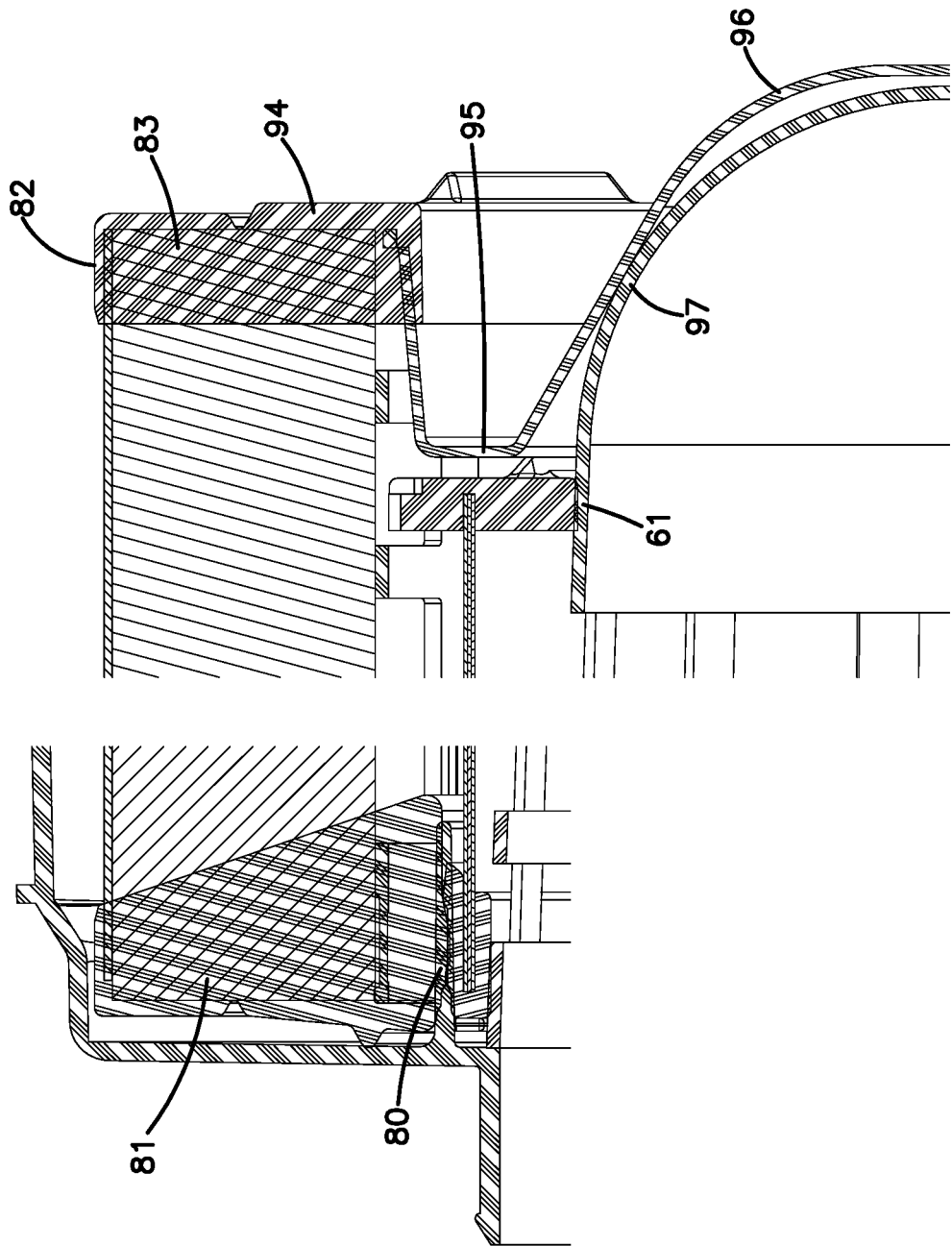
FIG. 12 is a partial, sectional view of the assembly of FIG. 11 without the access cover.
Figure 13:
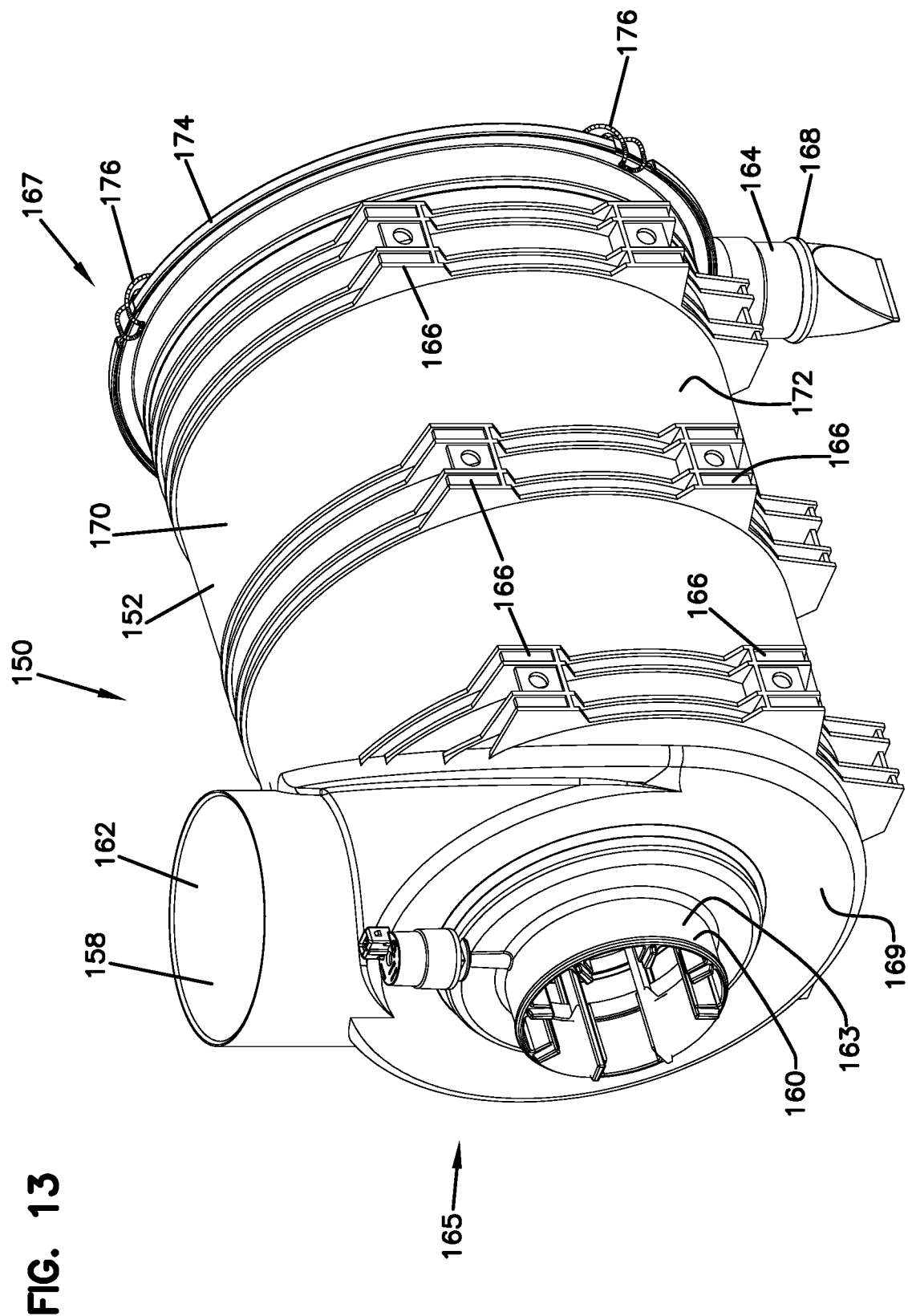
FIG. 13 is a side, perspective view of an alternative air cleaner assembly according to the present disclosure.

Now referring to FIGS. 1 and 11, an air cleaner assembly is shown at reference number 10. The air cleaner assembly 10 includes an air cleaner housing 12, a main filter element 14, and a safety filter element 16. The air cleaner assembly 10 can be applied in the filtering or cleaning of a variety of gases. The air cleaner assembly 10 is suited for cleaning air for use in an internal combustion engine, such as the engine of a vehicle such as a truck, bus, tractor, or construction equipment; or for a generator.

The air cleaner housing 12 includes an air inlet 18 and an air outlet 20. In FIG. 11, the air cleaner assembly 10 has been cutaway to show the internal components and, as a result, the air inlet 18 is not shown in FIG. 11. Nevertheless, it should be understood that the air inlet 18 is present on the operable air cleaner assembly 10. In general, dirty air or air in need of cleaning enters the air cleaner assembly 10 through the air inlet 18, and clean air exits the air cleaner assembly 10 through the air outlet 20.

The air cleaner housing 12 includes optional mounting legs or supports 22 thereon to facilitate mounting. Alternatively, the air cleaner assembly 10 can be mounted with a separate mounting band or bracket. The air cleaner assembly 10 can be provided in a variety of orientations. An exemplary orientation has the outlet 20 extending vertically. However, many of the principles and techniques described can be applied to air cleaner assemblies mounted in other orientations.

The particular air cleaner air cleaner housing 12 has a housing side wall 24 that can generally be considered as cylindrical in overall shape. The air inlet 18 can be referred to as a tangential inlet 26 that goes through the housing side wall 24. The term "tangential" in this context is meant to indicate that a center line of the air inlet 18 is not directed toward a center access of the air cleaner assembly 10, but rather is directed more tangentially. This causes the air entering through the tangential inlet 26 to begin movement in a swirling pattern. The swirling pattern is facilitated by the generally cylindrically shaped housing side wall 24. Alternatively, the air inlet can be provided so that it is radial. That is, the air entering through the air inlet can enter in a radial direction toward a center of the air cleaner assembly.

The air cleaner air cleaner housing 12 includes a main housing 28 and a service cover 30. For the particular air cleaner air cleaner housing 12, parts of the main housing 28 and the service cover 30 form the housing side wall 24. The service cover 30 is constructed so that it is removable from the main housing 28. Latches 32 are available for holding the service cover 30 onto the main housing 28. The particular latches 32 shown are a type of over center latch 34. Other types of latches can be used. The service cover 30 includes a closed end 36. In general, the characterization of a closed end means that mass air flow does not occur through the closed end 36. That is, the closed end 36 does not operate as an air inlet or outlet during operation of the air cleaner assembly 10.

The air outlet 20 can be characterized as a circular, axial, outlet 38. By "axial" in this context, it is meant that a center line or axis of the outlet 20 extends parallel to a center line or axis of the air cleaner housing 12. In the particular instance shown, the center line of the circular, axial, outlet 38 is coaxial with the center line of the air cleaner housing 12. Of course, alternative configurations are available. For example, the air outlet can be eccentrically positioned relative to the center line of the air cleaner housing 12.

The main housing 28 has a first end 29 and a second end 31. The air outlet 20 extends through the first end 29, and the air inlet 18 extends between the first end 29 and the second end 31. The service cover 30 attaches to the main housing 28 at the second end 31. The first end 29 and the second end 31 can both be characterized as open. The first end 29 can be characterized as open because of the presence of the air outlet 20 extending therethrough. The second end 31 can be characterized as open because the service cover 30 is removable from the first end 31. When the service cover 30 is attached to the second end 31, the air cleaner second end 35 can be characterized as closed. The air cleaner first end 33 can be characterized as open for the same reason that the main housing first end 29 is characterized as open.

Now referring to FIGS. 2-5, assembly of the safety liner 40 as part of the air cleaner housing 12 is shown. The safety liner 40 includes an open support structure 42, a safety liner closed end cap 44, and a plurality of attachment tabs 46 at a downstream end 48. The open support structure 42 is provided to support the safety filter element 16, and allow air to flow therethrough to the open interior 50 of the safety liner 40. During operation of the air cleaner assembly 10, air that flows into the open interior 50 can generally be considered clean air and flows out through the air outlet 20.

Figure 3:
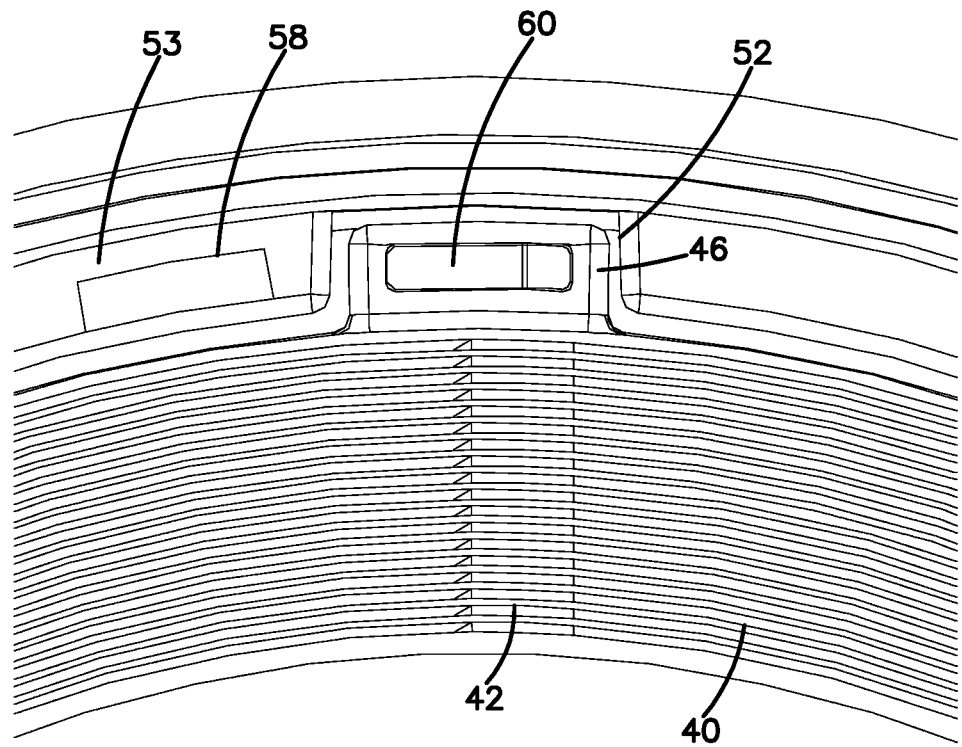
FIG. 3 is a perspective view showing attachment of the safety liner to the housing of the assembly of FIG. 1.
Figure 4:
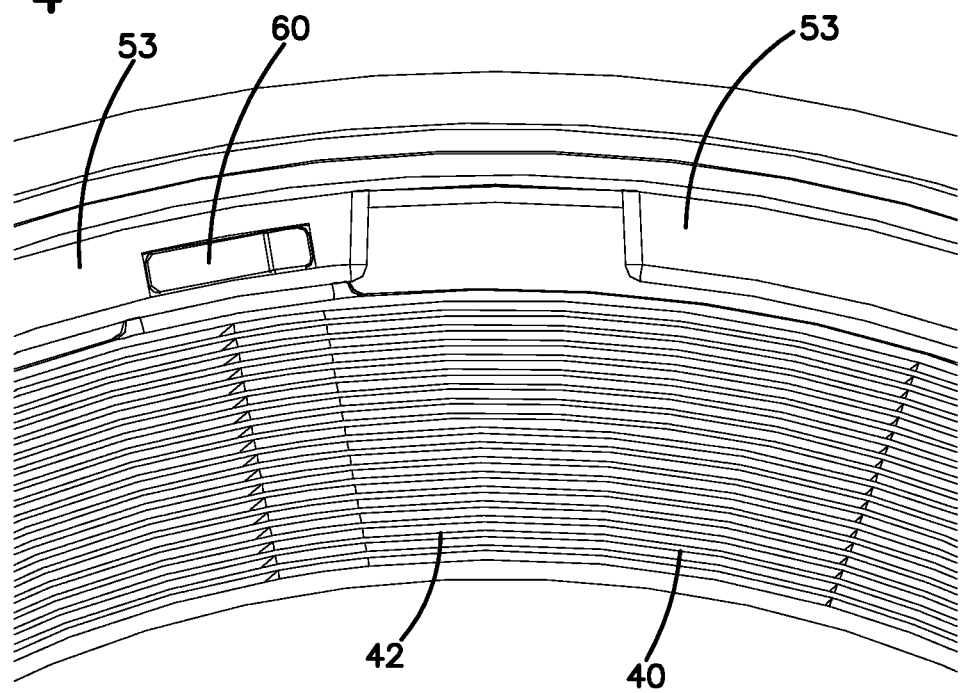
FIG. 4 is a perspective view showing attachment of the safety liner to the housing of the assembly of FIG. 1.

The attachment tabs 46 extend from the safety liner 40 so that they are capable of engaging openings 52 provided in the flange 53 of the air outlet 20. The attachment tabs 46 can be provided so that they extend at about a 90° angle relative to the cylindrically extending direction of the safety liner 40. The attachment tabs 46 can engage or fit within the openings 52 in the flange 53. The flange 53 extends sufficiently far away from the outlet collar 55 to receive the attachment tabs 46. As a result of a twisting movement of the safety liner 40, the attachment tabs can extend beneath the flange 53, and can snap into place within the snap fit opening 58. As shown in FIGS. 3 and 4, the attachment tabs 46 include a snap fit member 60 that fits within the snap fit opening 58. Once the snap fit member 60 engages the snap fit opening 58, the safety liner 40 can generally be considered to be locked in place and can be considered a part of the air cleaner housing 12.

Figure 2:
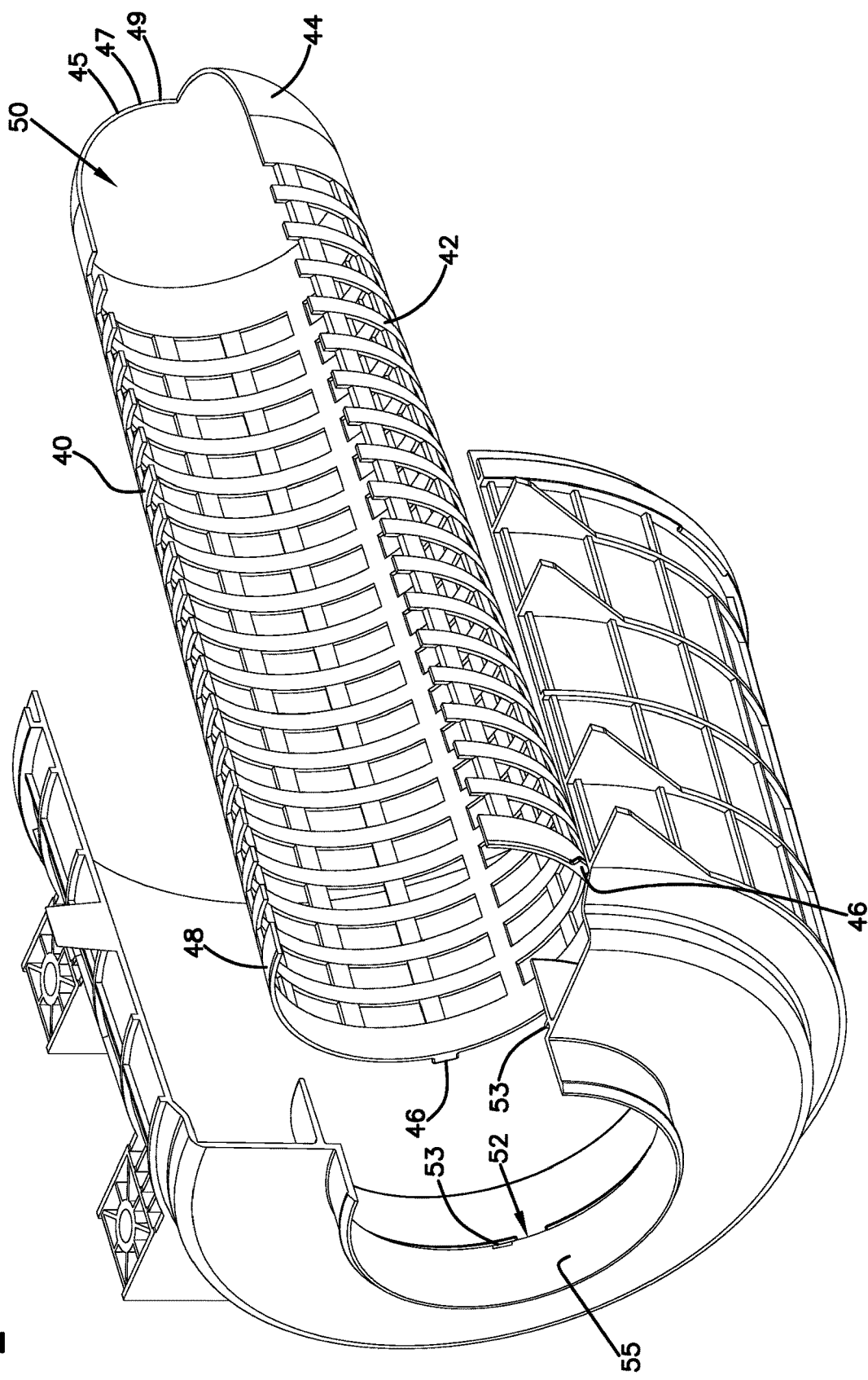
FIG. 2 is a cutaway, exploded, perspective view of components of the assembly of FIG. 1.
Figure 2A:
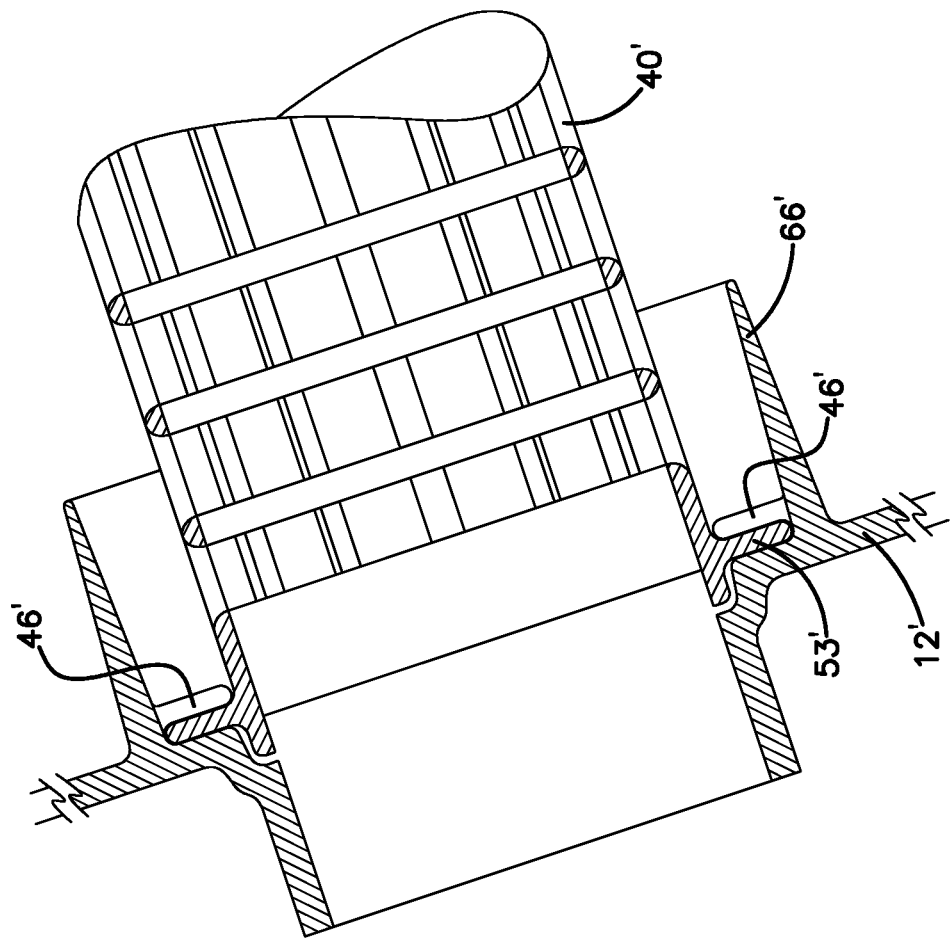
FIG. 2a is a cutaway, side, sectional view showing an alternative arrangement for attaching the safety liner to the air cleaner housing.

An alternative arrangement for attaching the safety liner 40' to the air cleaner housing 12' is shown in FIG. 2a. The safety liner 40' includes a flange 53' extending radially away from the axis of the air cleaner along a circumference of the safety liner 40'. The flange 53' includes openings (not shown but similar to openings 52 in the flange 53) for receipt of the attachment tabs 46' extending radially from the air cleaner housing 12'. The attachment tabs 46' can have a structure similar to the attachment tabs 46 except that they extend radially from the radial seal member 66'. In addition, the attachment tabs can include snap fit members, and the snap fit members can engage snap fit openings in the flange 53'.

Figure 5:
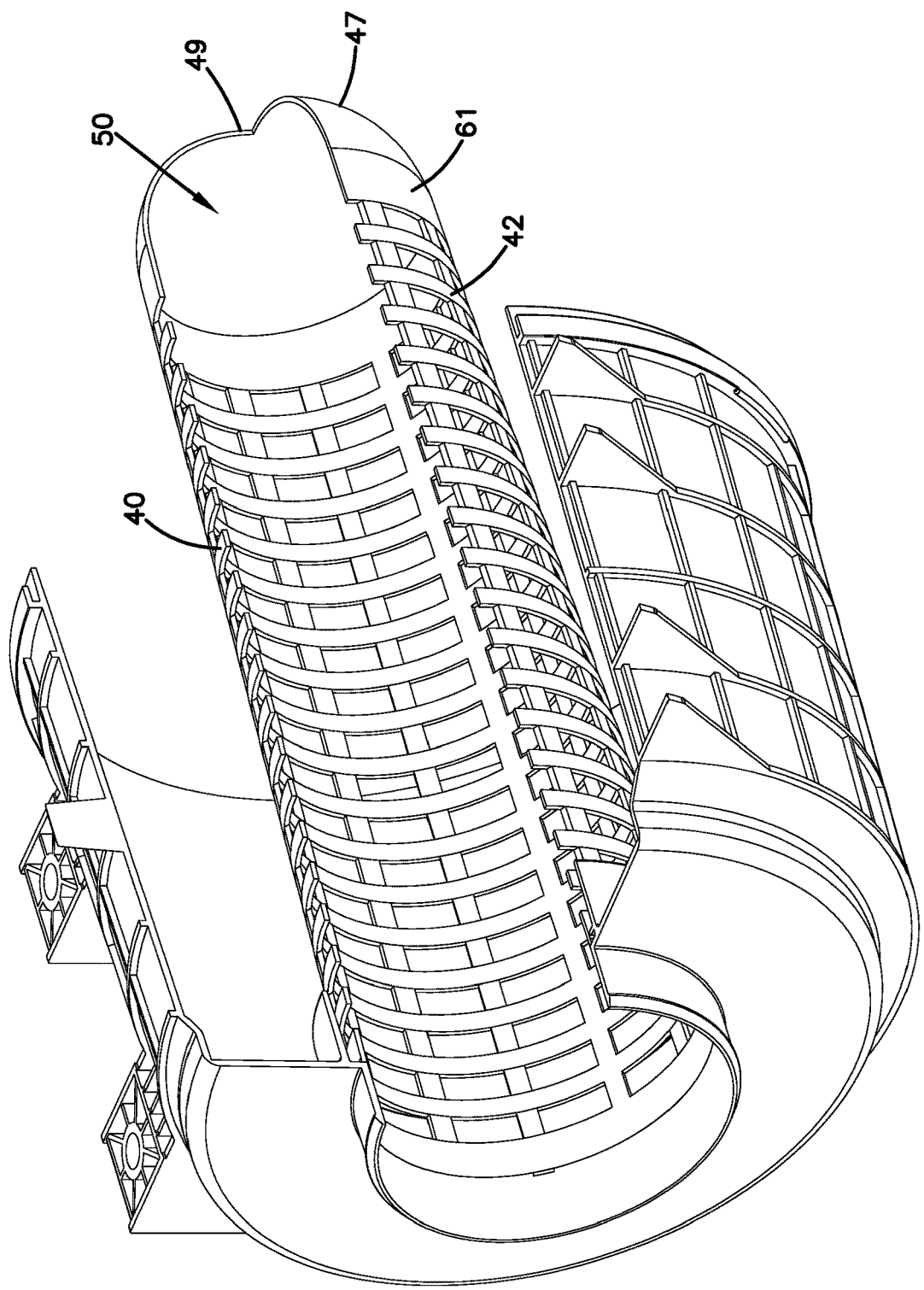
FIG. 5 is a cutaway, perspective view of components of the assembly of FIG. 1.
Figure 8:
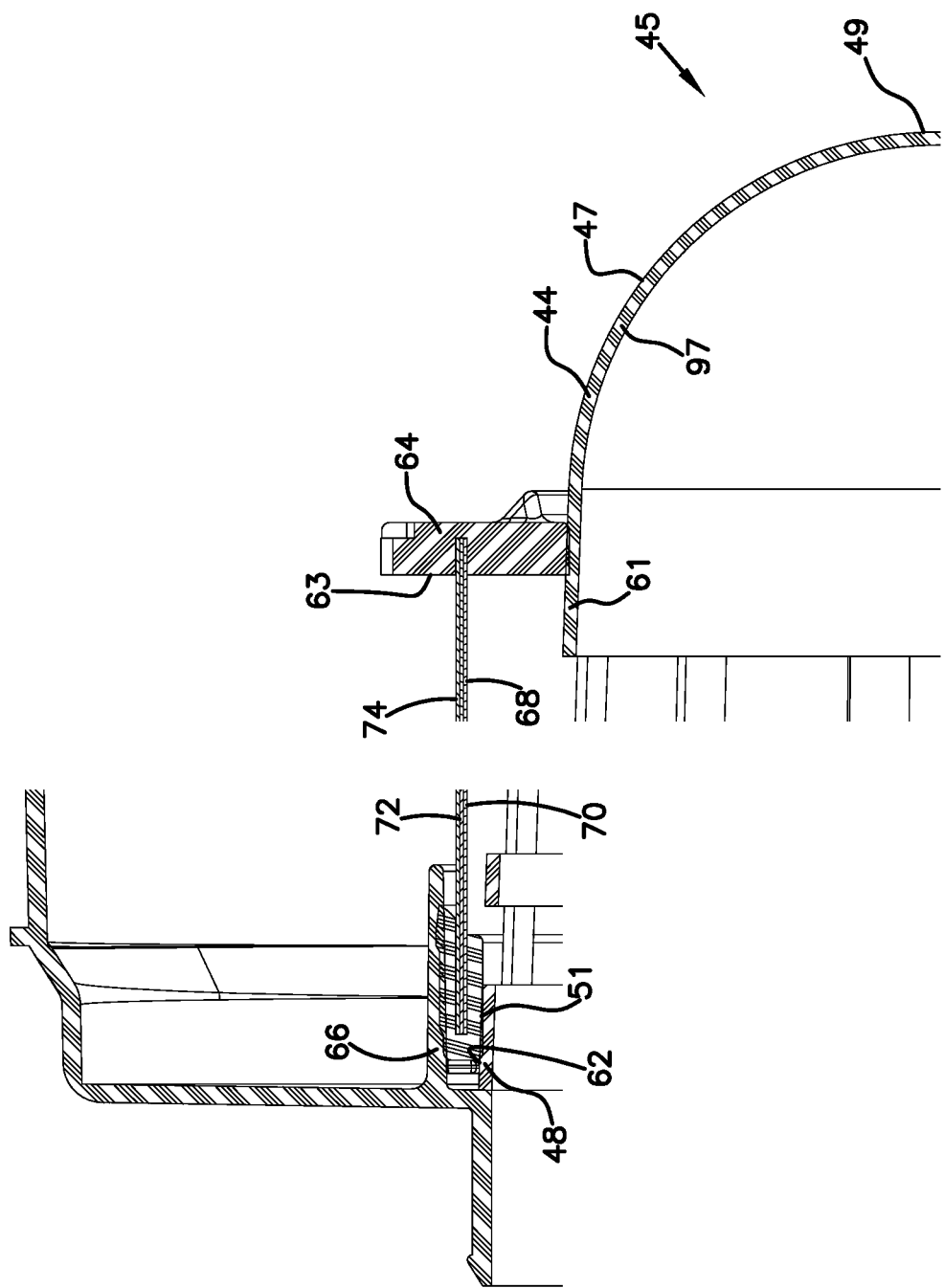
FIG. 8 is a partial, sectional view of the assembly of FIG. 7.

Now referring to FIGS. 2, 5, and 8, the safety liner closed end cap 44 can be characterized as having a spherical shape 45. By a spherical shape, it is meant that the outside surface 47 is generally curved and provides an apex 49 at about the center of the safety liner closed end cap 44. The safety liner closed end cap 44 can be provided with shapes other than a spherical shape.

Figure 6:
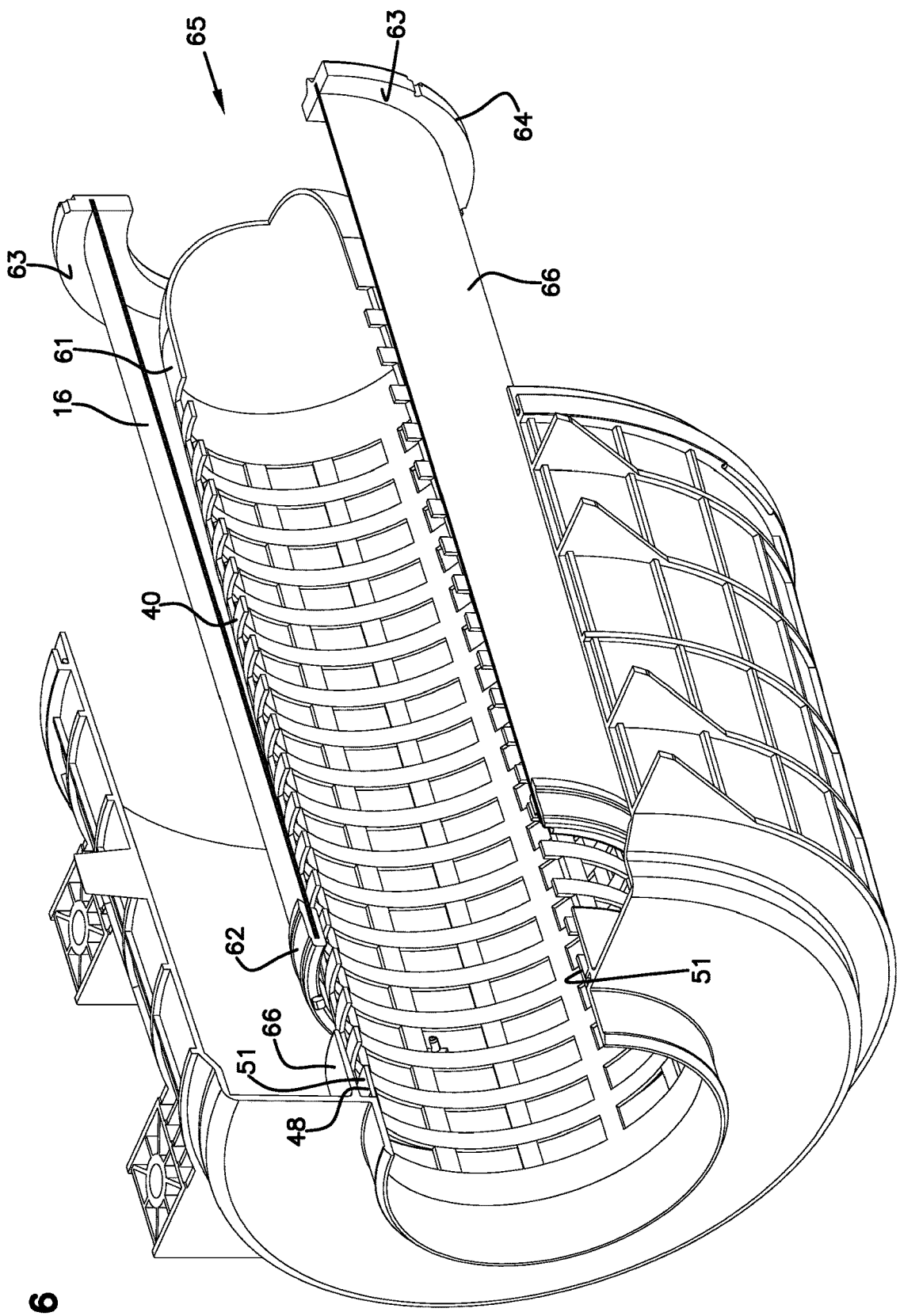
FIG. 6 is a cutaway, perspective view of components of the assembly of FIG. 1 showing attachment of a safety media.
Figure 7:
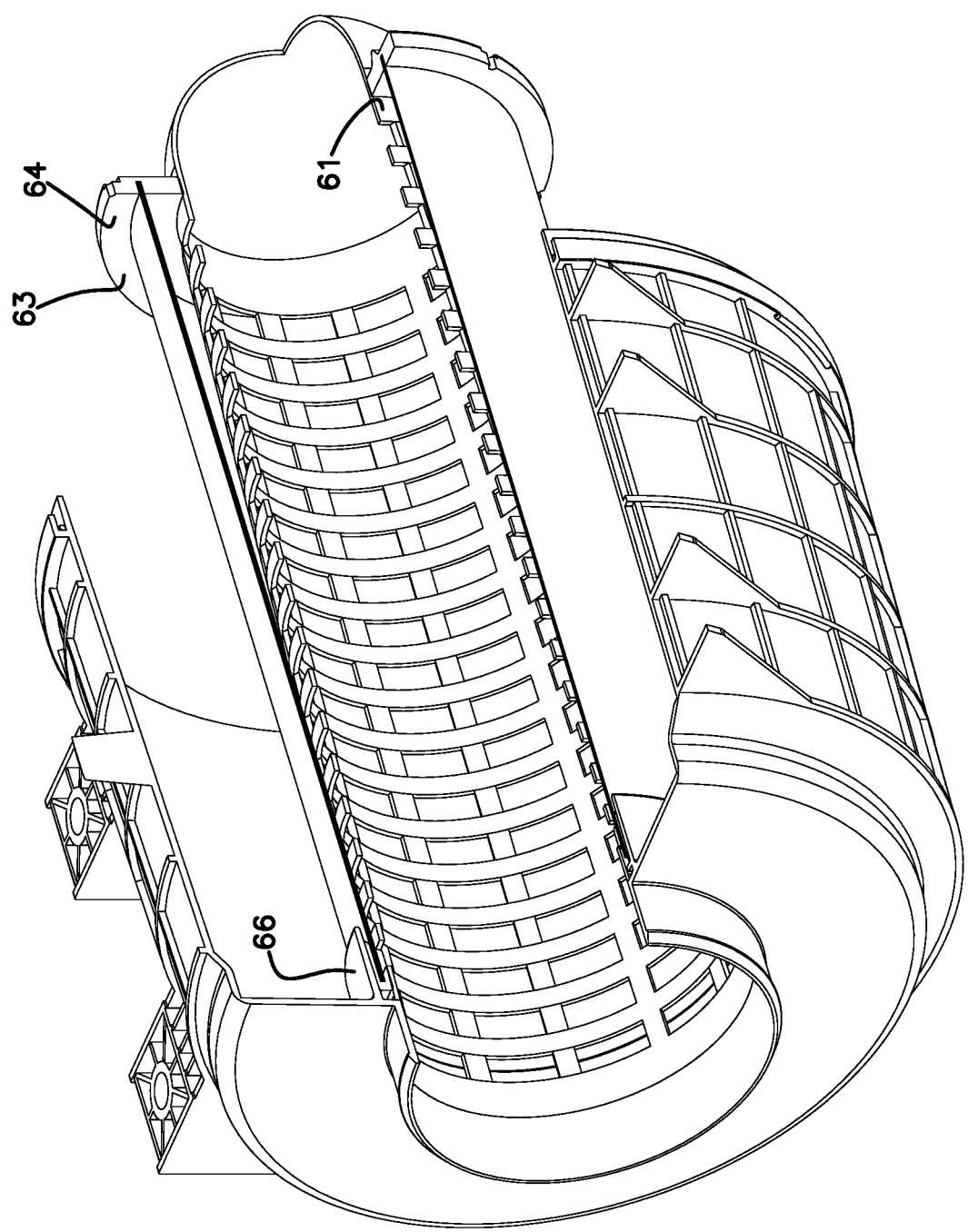
FIG. 7 is a cutaway, perspective view of components of the assembly of FIG. 1 showing attachment of a safety media.

Now referring to FIGS. 6-8, the safety filter element 16 extends over the safety liner 40. In FIG. 6, the safety filter element 16 is shown being applied over or removed from the safety liner 40. The safety filter element 16 includes a safety downstream seal member 62 and a safety end cap seal member 64. The safety downstream seal member 62 is provided for sealing between the downstream end 48 of the safety liner and a radial seal member 66 that is part of the air cleaner housing 12. The downstream end 48 of the safety liner can include a sealing surface 51 that can be considered part of the main housing 28. The safety downstream seal member 62 fits between the sealing surface 51 and the radial seal member 66 to provide a seal.

The safety filter element 16 includes a media structure 68. The media structure 68 is shown as a tri-layer structure including a first layer 70, a second layer 72, and a third layer 74. The first layer 70 and the third layer 74 can be provided as media, and the second layer 72 can be provided as a support structure to support the safety filter element 16 so that it maintains its shape. Alternatively, the first layer 70 and the third layer 74 can be support structure, and the second layer 72 can be filtration media. Other alternatives are possible. For example, the media structure can be provided as a by-layer structure including one layer or two layers of filtration media. The media structure 68 extends within the downstream seal member 62 so that the media structure 68 extends between the downstream end 48 of the safety liner 40 and the radial seal member 66. As a result, the media structure 68 assists in the seal between the downstream end 48 and the radial seal member 66.

The media structure 68 extends into the end cap seal member 64. The safety end cap seal member 64 provides a sealing engagement with the safety liner closed end cap 44. The end cap seal member 64 provides an annular seal around the end cap periphery 61, and forms a central aperture 65. The safety end cap seal member 64 includes a gripping surface 63 that allows one to grasp the safety end cap seal member 64 and pull the safety filter element 16 off of the safety liner 40.

Now referring to FIGS. 9-12, placement of the main filter element 14 within the air cleaner housing 12 is shown. The characterization of a "main filter element" refers to the element that provides a majority of the air filtering function. The safety filter element is generally intended to protect the air inlet for the combustion engine during replacement of the main filter element 14. Accordingly, when the main filter element 14 is removed from the air cleaner housing 12, the safety filter element 16 remains in place to provide protection to the internal workings of the, for example, combustion engine.

The main filter element 14 includes a main filter element radial seal member 80, a main filter closed end cap 82, and filtration media 84. An exemplary type of filtration media 84 that can be used includes pleated media 86. The main filter element 14 can include a main filter element support 88 and a cover 90 to support and protect the filtration media 84. The cover 90 can be provided as a mesh or screen.

Figure 9:
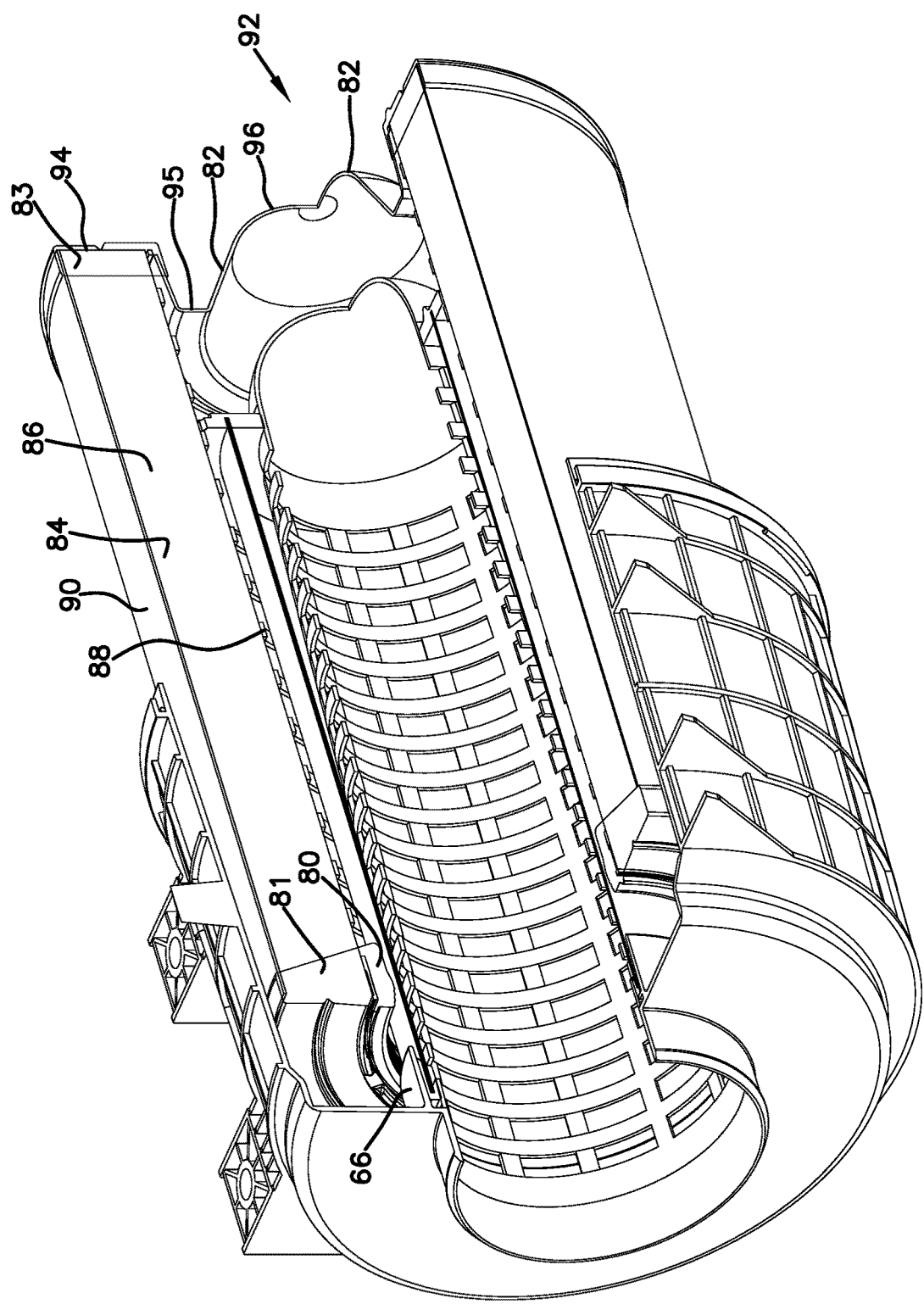
FIG. 9 is a cutaway, perspective view of the assembly of FIG. 7 showing attachment of the main filter element.
Figure 10:
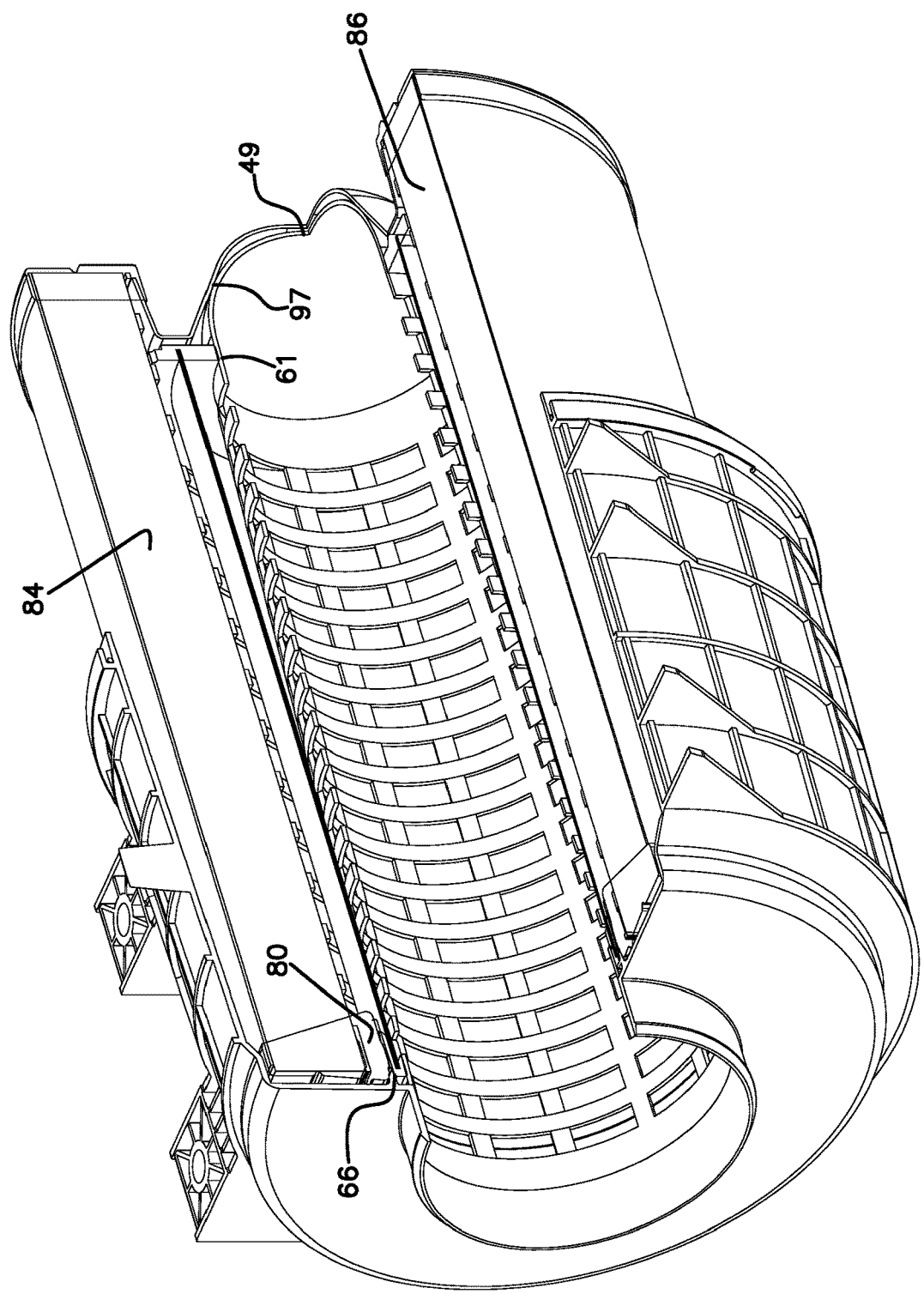
FIG. 10 is a cutaway, perspective view of the assembly of FIG. 7 showing attachment of the main filter element.

In FIG. 9, the service cover 30 has been removed from the air cleaner housing 12 and the main filter element 14 is being introduced into or removed from the housing interior 92. As shown in FIG. 10, the main filter radial seal member 80 forms a radial seal with the radial seal member 66 of the air cleaner housing 12. The radial seal member 80 can be characterized as an inward facing radial seal member because the sealing surface is provided toward the inner portion of the main filter element 14. In addition, it should be understood that the filtration media 84 can be potted within the first open end cap 81 that can contains the radial seal member 80, and the second closed end cap 83.

The closed end cap 82 includes an annular rim area 94, a recess 95, and a central bump 96. The annular rim area 94 generally covers the filtration media 84 that extends annularly or cylindrically within the housing interior 92. The filtration media 84 can be embedded within the main filter closed end cap 82 at the annular rim area 94. The central bump 96 can be provided having a sufficiently spherical shape or other shape so that when the main filter element 14 is fully inserted within the housing interior 92, the central bump 96 contacts or is supported by the safety liner closed end cap 44. In a preferred arrangement, the central bump 96 does not contact the safety closed end cap 44 at the apex 49, but does contact the safety closed end cap 44 or is supported by the safety closed end cap 44 along an annular area 97 between the apex 49 and the end cap periphery 61. In general, the closer the annular area 97 is to the end cap periphery 61, the larger the potential contact area. Increased contact area can assist with the stability of the main filter element 14 within the housing 12. In order to provide this contact, the closed end cap 82 includes a recess 95 between the annular rim area 94 and the central bump 96. The recess 95 can extend annularly between the annular rim area 94 and the central bump 96.

The service cover 30 can be attached to the main housing 28 and latched in place. The service cover 30 can include a service cover annular rim area 102, a service cover central bump 104, and a service cover recess 106. In general, the service cover annular rim area 102, the service cover central bump 104, and the service cover recess 106 can be provided so that they generally correspond with the closed end cap annular rim area 94, the closed end cap central bump 96, and the closed end cap recess 95. The service cover can help hold the main filter element 14 in place within the housing 12. The service cover annular rim area 102 can help push the main filter element 14 in place.

During operation, air enters the air cleaner assembly 10 through the air inlet 18. Air circulates between the housing side wall 24 and the main filter element 14, and passes through the main filter element 14 and then through the safety filter element 16, into the open interior 50, and out of the air cleaner assembly via the air outlet 20.

Now referring to FIGS. 13-22, an alternative embodiment of an air cleaner assembly is shown at reference number 150. The air cleaner assembly 150 can include a housing 152, a main filter element 154, and a safety liner 180. The air cleaner assembly 150 provides for the filtering or cleaning of a variety of gases such as air for internal combustion engines.

The housing 152 includes an air inlet 158 and an air outlet 160. The air inlet 158 can be characterized as a tangential air inlet 162. The air outlet 160 can be characterized as an axial air outlet 163. The housing 152 additionally can include an optional drop tube 164 and can include optional mounting legs 166. The drop tube 164 can include an ejector valve 168. The housing 152 includes a main housing 170 and a service cover 174 that attaches to the main housing 170. The drop tube 164 and the ejector valve 168 can be provided as part of the service cover 174 or if desired, can be provided as part of the main housing 170.

The air cleaner assembly 150, as well as the housing 152, can be characterized as having a first end 165 and a second end 167. In general, the air outlet 160 can be characterized as extending through a housing end 169 at the first end 165. In addition, the air inlet 158 can be characterized as being provided between the first end 165 and the second 167, but can also be characterized as adjacent to the first end 165 in the embodiment shown in FIG. 13. The service cover 174, in the embodiment shown, can be characterized as attaching at the housing second end 167.

The housing 152 includes a main housing 170. The main housing 170 can be characterized as having a relatively cylindrical housing side wall 172. The air cleaner housing 152 includes a service cover 174 that attaches to the main housing 170. The service cover 174 can attach to the main housing 170 by latches 176.

Figure 14:
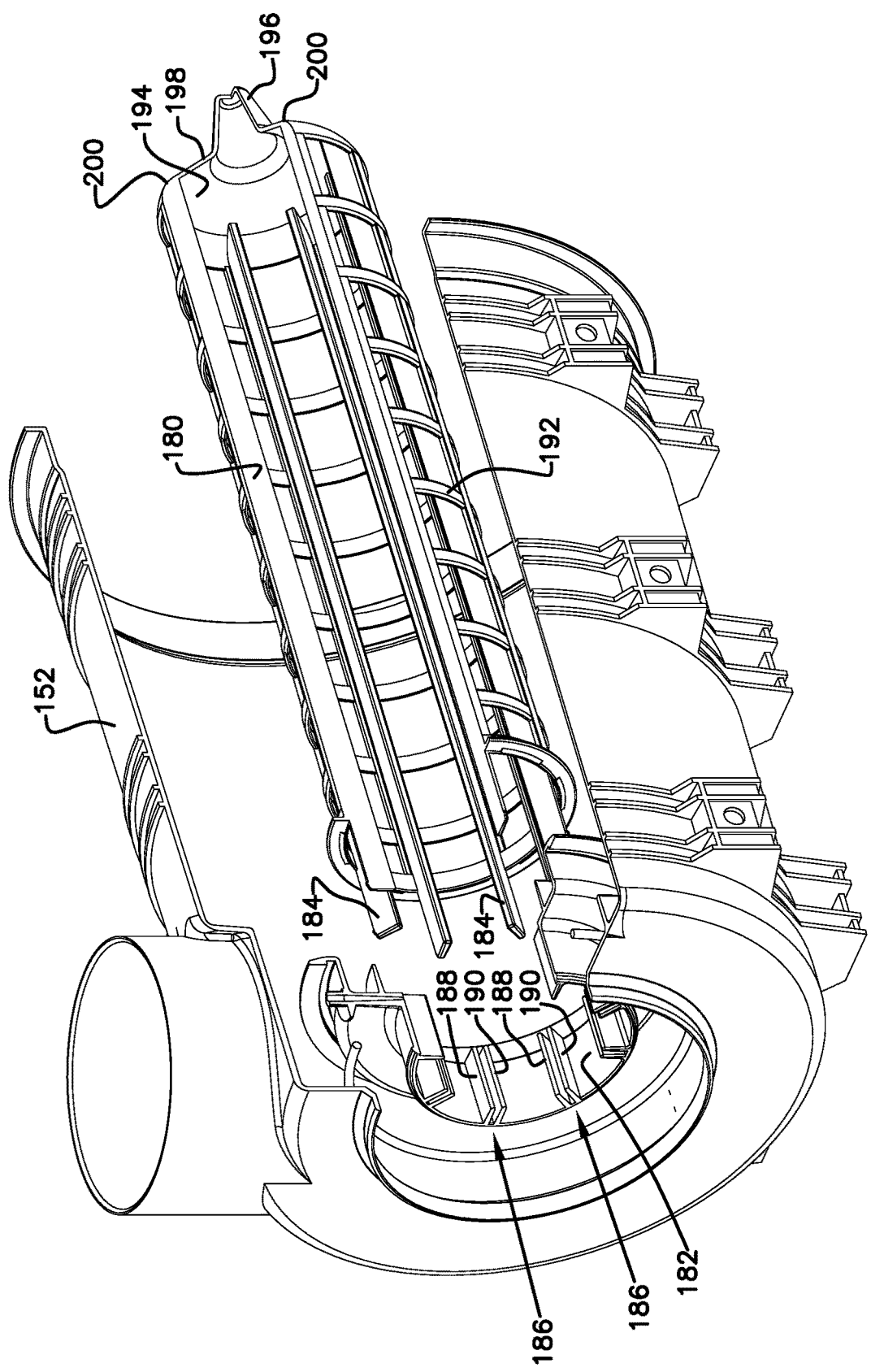
FIG. 14 is a cutaway, exploded, perspective view of components of the assembly of FIG. 13.
Figure 15:
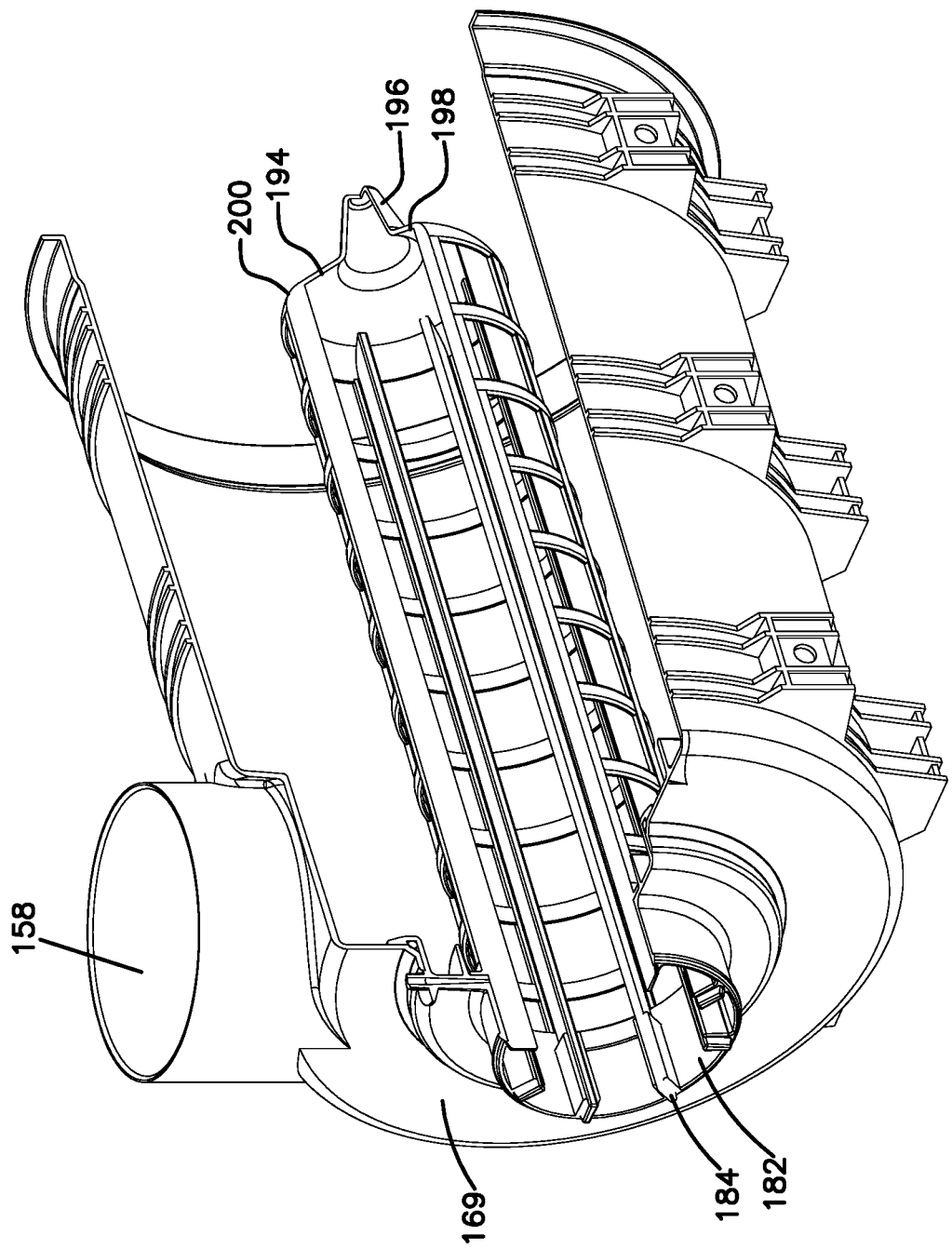
FIG. 15 is a cutaway, perspective view of a portion of the assembly of FIG. 13.
Figure 16:
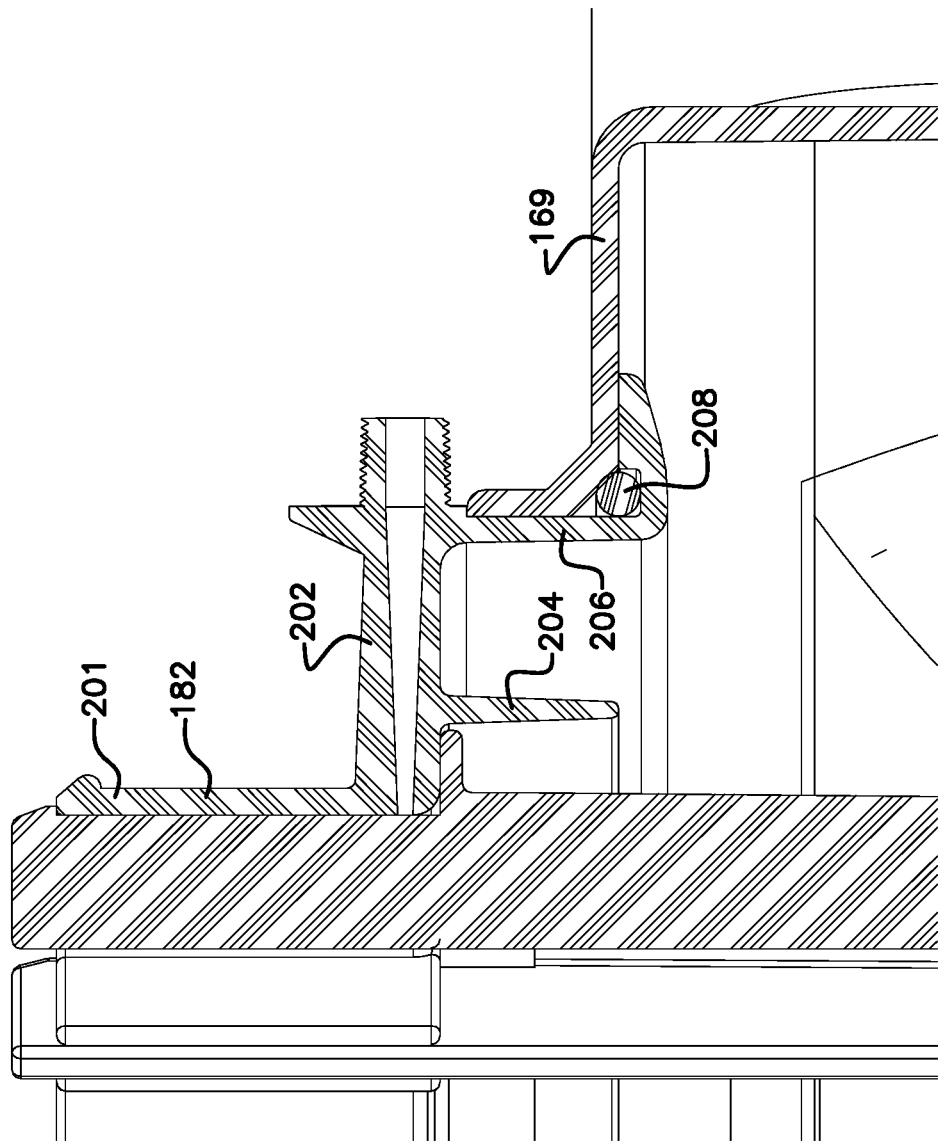
FIG. 16 is a partial, sectional view of the assembly of FIG. 15.

Now referring to FIGS. 14-16, attachment of the safety liner 180 to the collar 182 is shown. The safety liner 180 includes bayonets (or projections) 184, and the collar 182 includes bayonet receivers 186. The bayonets 184 slide within the bayonet receivers 186 to fit. The bayonet receivers include first side walls 188 and second side walls 190. The first side walls 188 and the second side walls 190 hold the bayonets 184 in place. In addition, the bayonet receivers 186 can be molded in place. By way of example, the safety liner can include about 4 to about 8 bayonets and the collar can include about 4 to about 8 bayonet receivers to receive the bayonets.

The safety liner 180 additionally includes a support structure 192 for supporting the safety filter element 156. In addition, the safety liner 180 includes a closed end cap 194.

The closed end cap 194 includes a central cone extension 196, and a shoulder area 198 extending about the central cone extension 196 and between the central zone extension 196 and the closed end cap periphery 200. The closed end cap periphery 200 generally refers to the annular edge region at the periphery of the closed end cap 194.

The collar 182 includes an arm 201, a collar extension 202, a safety seal member 204 extending from collar extension 202, and a radial seal member 206 extending from the collar extension 202. A gasket or o-ring 208 can be provided to seal the collar 182 to the downstream end cap 169 of the housing 152. The collar 182 can be snap fit onto the housing end 169. The snap fit assembly is generally shown in FIGS. 14 and 16.

Figure 17:
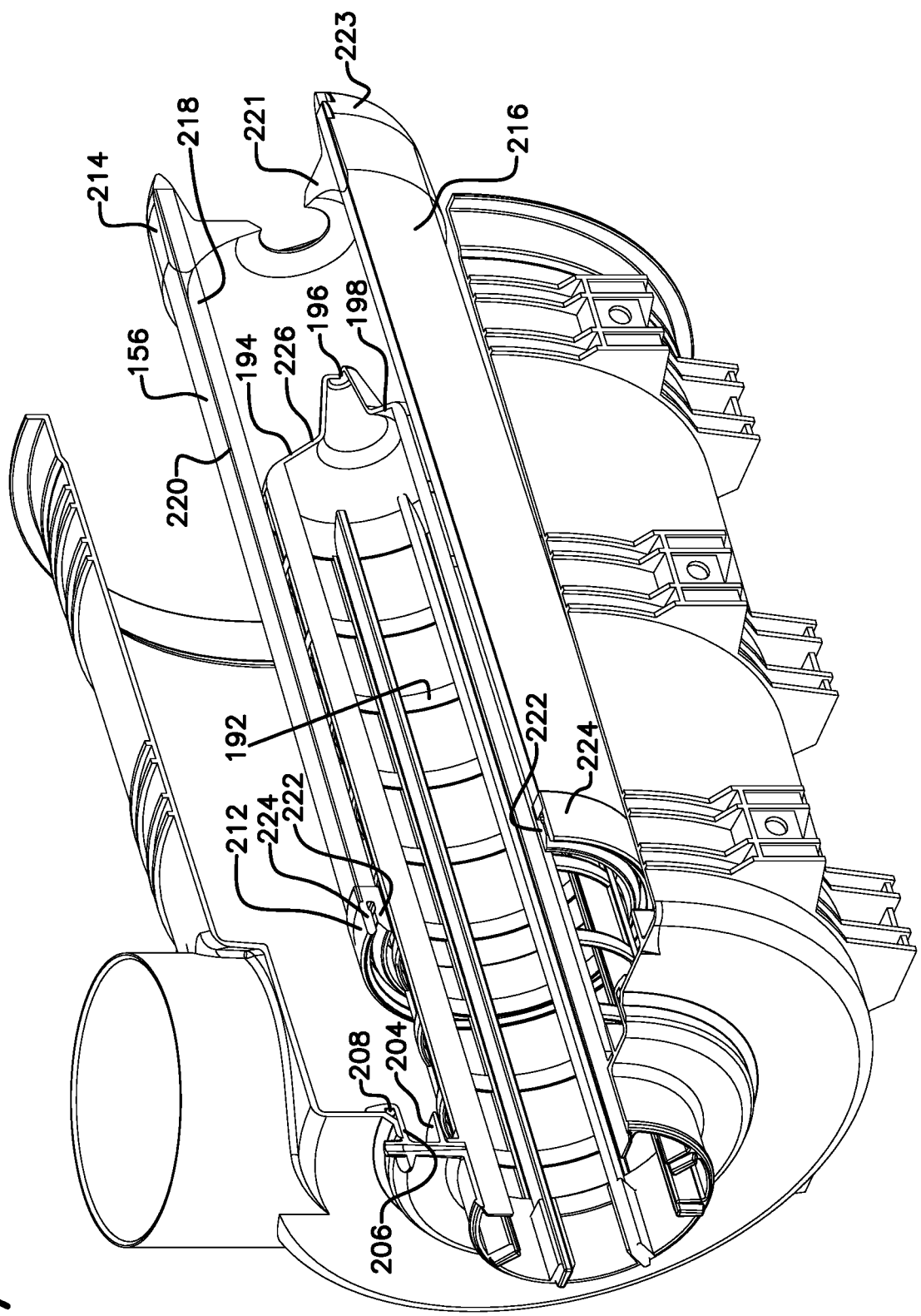
FIG. 17 is a cutaway, perspective view showing attachment of the safety filter media.
Figure 18:
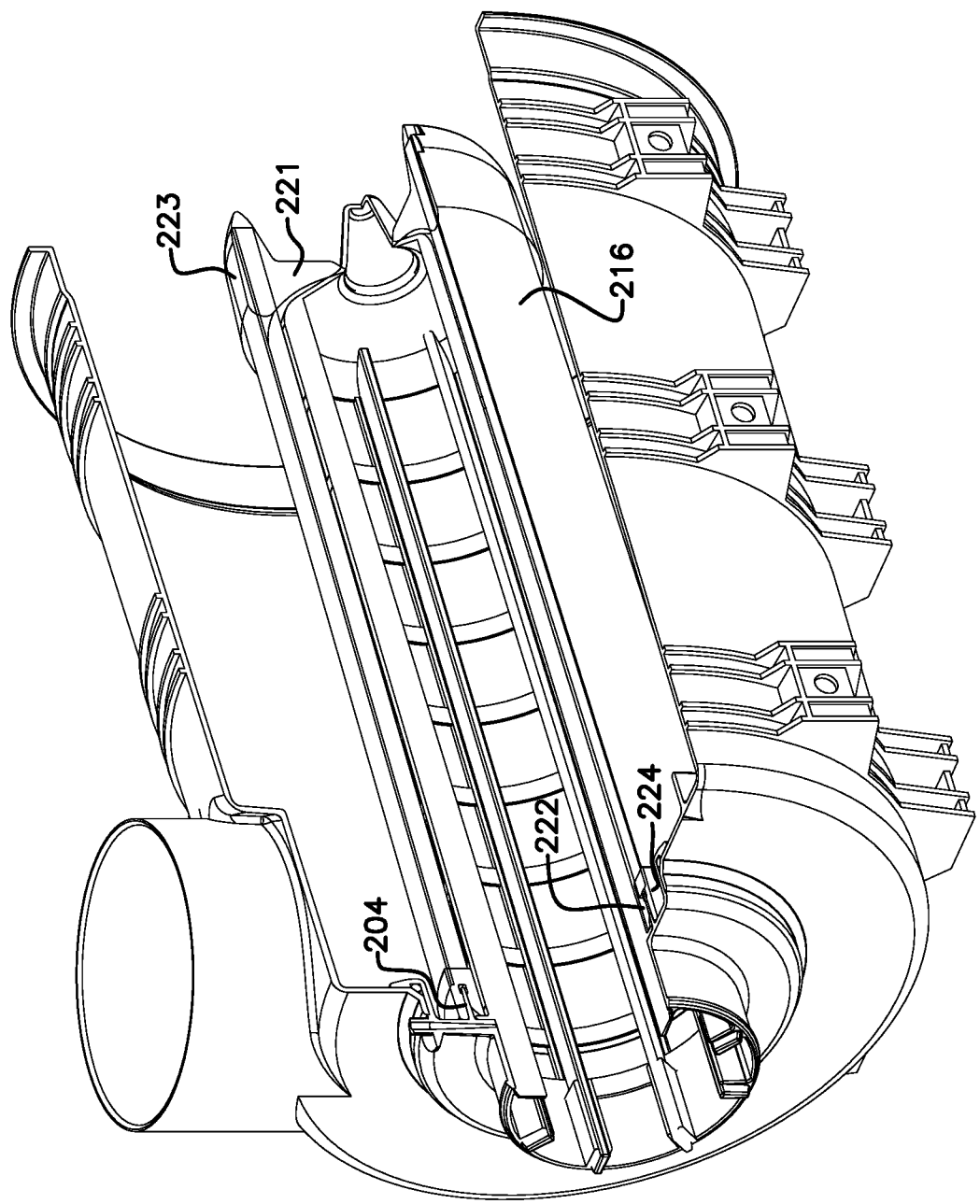
FIG. 18 is a cutaway, perspective view showing attachment of the safety filter media.
Figure 19:
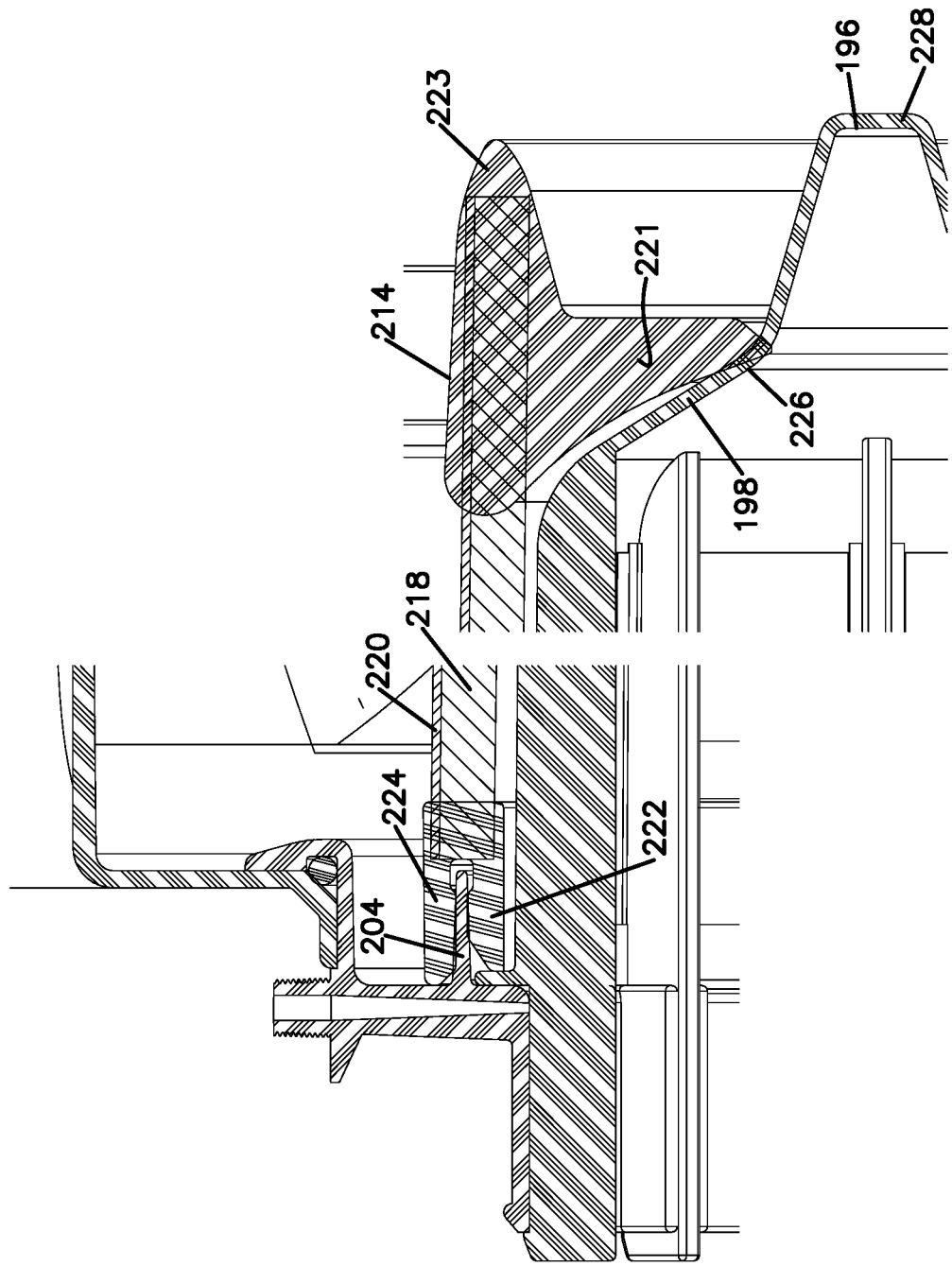
FIG. 19 is a partial, sectional view of the assembly of FIG. 18.
Figure 20:
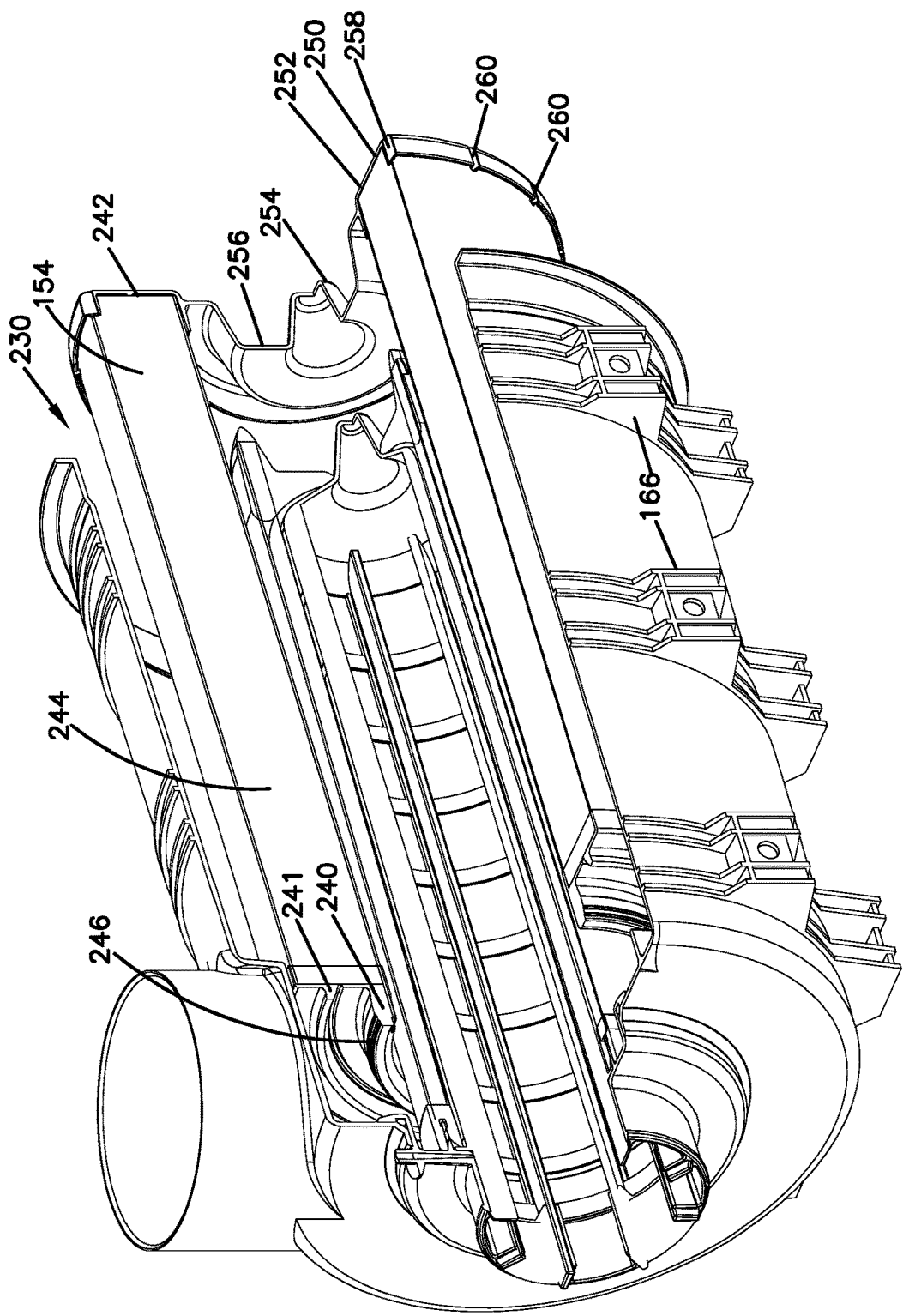
FIG. 20 is a cutaway, perspective view showing attachment of the main filter element.
Figure 21:
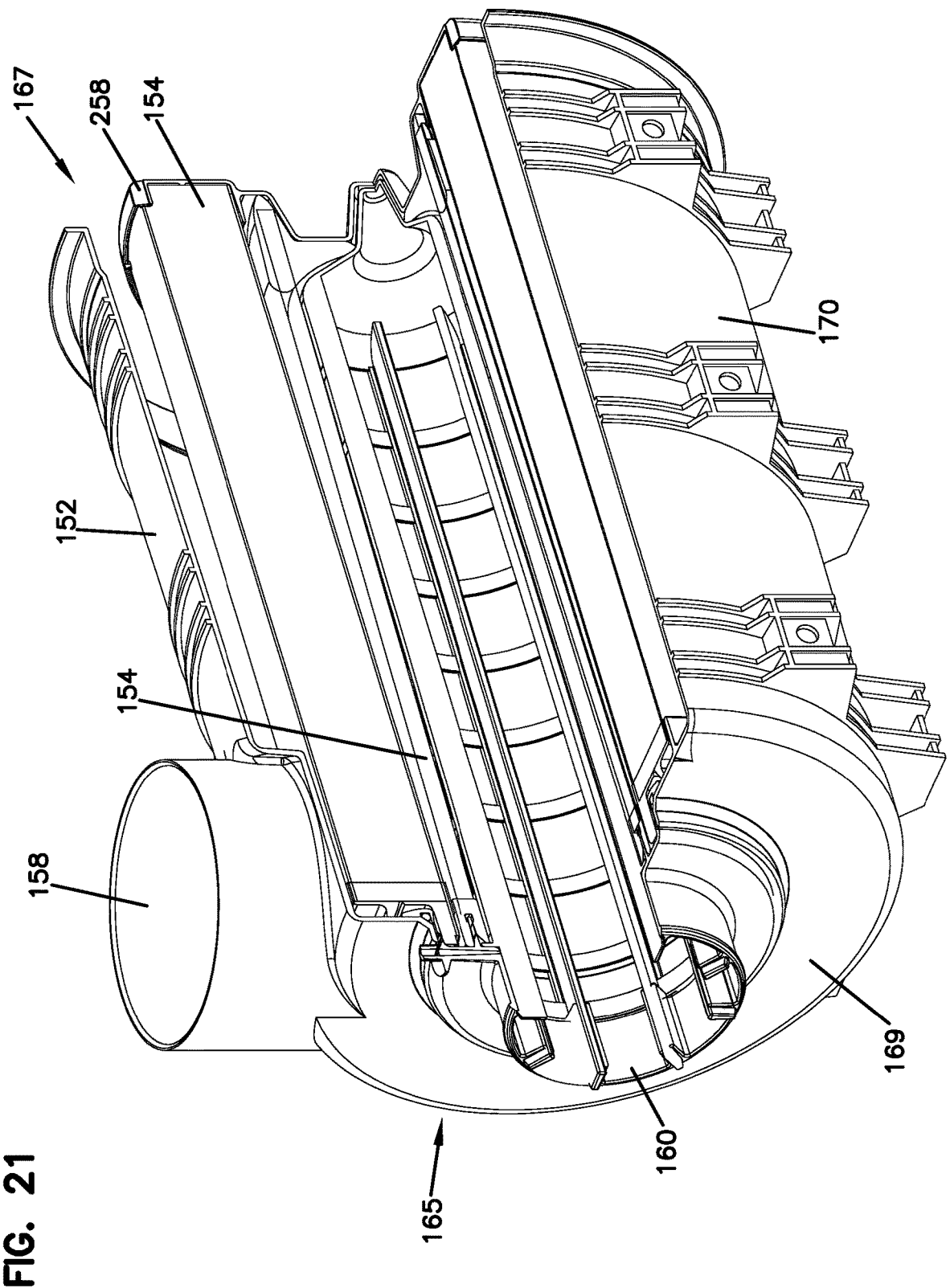
FIG. 21 is a cutaway, perspective view showing attachment of the main filter element.
Figure 22:
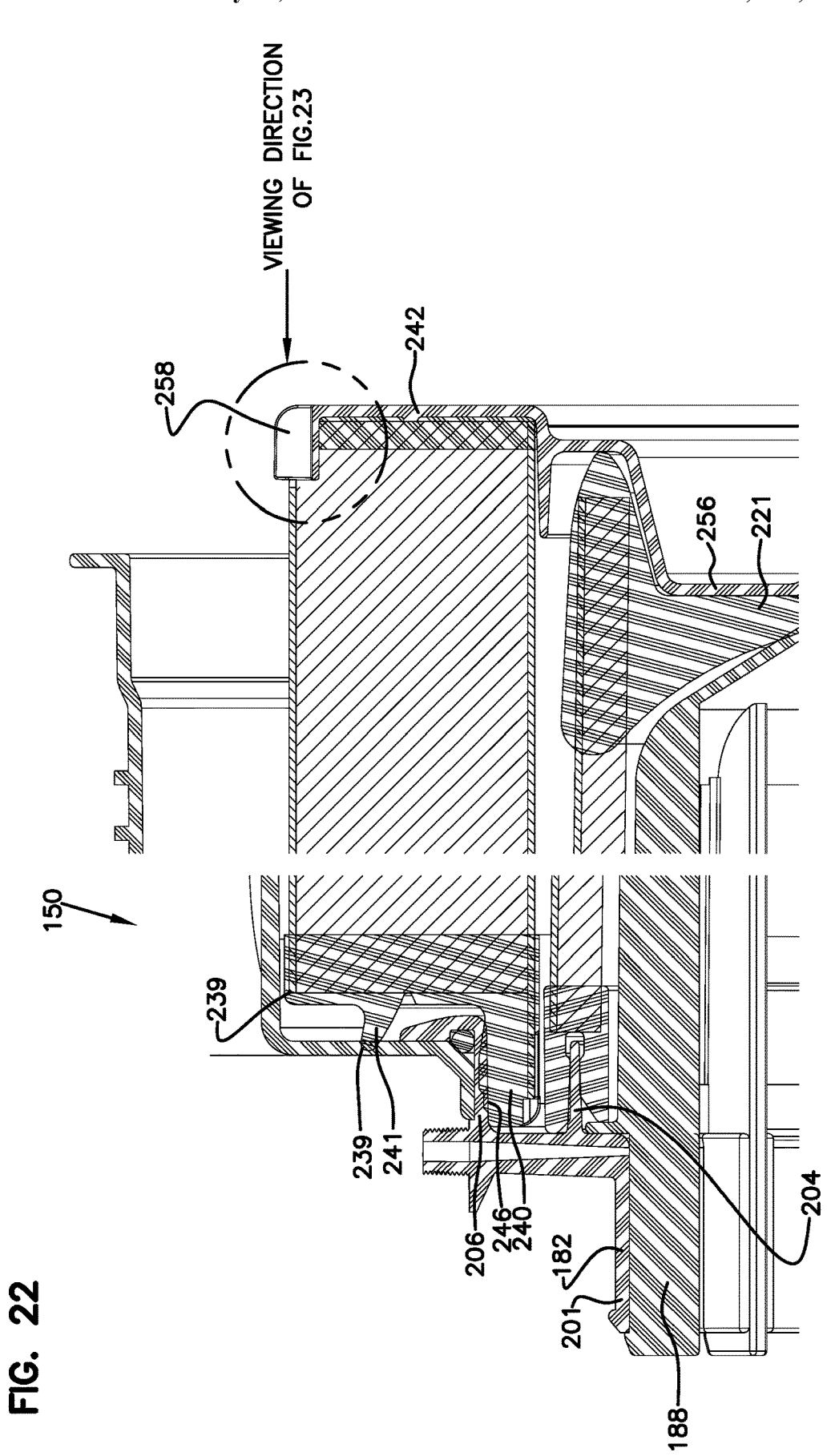
FIG. 22 is a partial, sectional view of the assembly of FIG. 13 without the access cover.
Figure 23:
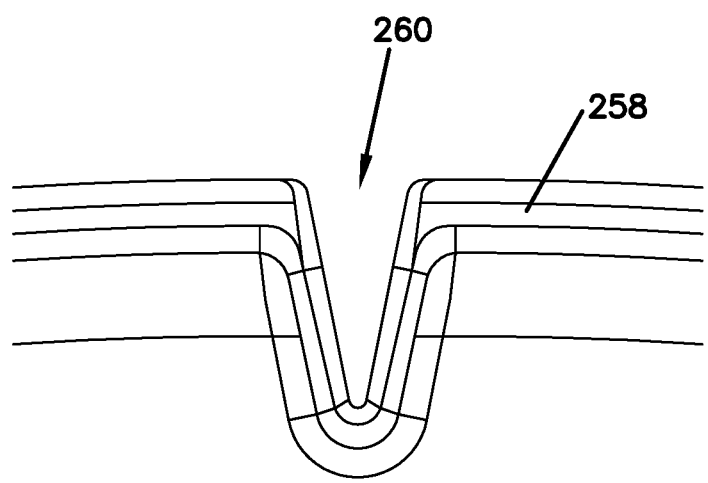
FIG. 23 is a end view showing the slot on the closed end of the main filter element of FIG. 22.
Figure 24:
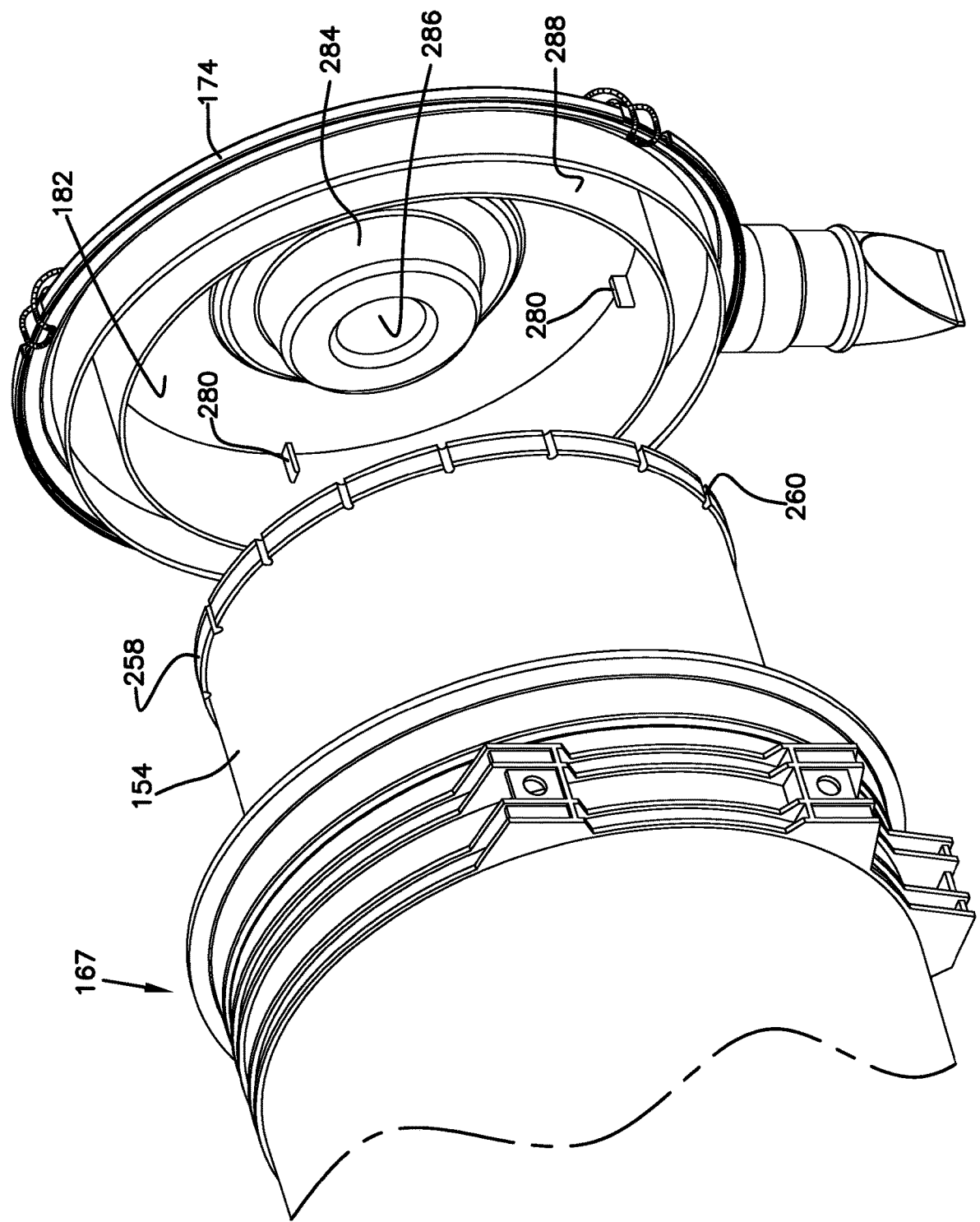
FIG. 24 is a partial, exploded view of the assembly of FIG. 11.

Now referring to FIGS. 17-19, placement of the safety filter element 156 on the support structure 192 is shown. The safety filter element 156 includes a safety seal member 212, a safety end cap seal member 214, and a safety media structure 216. The safety media structure 216 can be provided similar to the safety media structure 68. The safety media structure 216 can be provided having a layer of filtration media 218 and a layer of support structure 220. The layer of filtration media 218 can, if desired, be pleated media.

The safety seal member 212 includes a lower seal member 222 and an upper seal member 224. The safety seal member 212 engages the safety seal member 204 to provide a seal so that the lower seal member 222 and the upper seal member 224 provide compressive force on the safety seal member 204. The safety seal member 204 can be referred to as the housing safety seal member because it is part of the housing. The safety seal member 212 can be referred as a pinch radial seal because the lower seal member 220 and the upper seal member 224 compress the safety seal member 204. The safety seal member 212 can be made of polyurethane material.

The safety end cap seal member 214 includes a first extension arm 221 that engages the closed end cap 194 at a base 226 of the central cone extension 196. The base 226 can be provided as part of the shoulder 198. The base 226 helps seal, center, support, and guide the safety filter element 156 on the support structure, and avoid risk of collapsing. The safety end cap seal 214 includes a second extension arm 223 that extends axially along a length of the safety media structure 216. The second extension arm 223 extends beyond the first extension arm 221 axially toward the apex 228 of the central cone extension 196. The safety end cap seal member 214 can be provided as a polyurethane material. In addition, the structure of the safety end cap seal member 214 can provide a desirable guide for the safety media structure 216 during the molding process.

Now referring to FIGS. 20-24, insertion of the main filter element 154 into the housing interior 230 is shown. The main filter element 154 includes a first open end cap 239, a second closed end cap 242, and a main filtration media 244 extending from the first open end cap 239 to the second closed end cap 242. The first open end cap 239 includes a radial seal member 240 and an axial seal member 241. The radial seal member 240 includes a radial seal surface 246 that engages the radial seal member 206 to create an annular, radial seal. The radial seal member 240 can be characterized as an outwardly directed radial seal because the direction of the seal is outward and toward the radial seal member 206. The radial seal member 206 can be referred to as the housing radial seal member 206, and the radial seal member 240 can be referred to as the main filter element radial seal member 240. The axially seal member 241 is provided extending axially from the first open end cap 239. The axially seal member 241 can be characterized as a molded-in-place lip type axially seal 243. That is, the lip type axially seal can be provided so that it flexes when the main filter element is introduced into the housing. This allows the main filter element to absorb and tolerate the length of the main filter element while avoiding friction that can cause where between the main filter element and the service cover. The axially seal member 241 can be provided extending axially from the first open end cap 239 between the radial seal member 240 and the outer, peripheral 243 of the first open end cap 239. Furthermore, the main filtration media 240 can be potted within the first end cap 239 and within the second closed end cap 242. The first end cap 239 and the second end cap 242 can be made from polyurethane material.

The end cap 242 can be characterized as a closed end cap 250. The end cap 242 includes an annular rim area 252, a central bump 254, and a recess 256 between the annular rim area 252 and the central bump 254. The annular rim area 252 and the central bump 254 can be considered extending axially away from the first end 165. Similarly, the recess 256 can be characterized as an area extending axially toward the first end 165. In general, the annular rim area 252 contains the filtration media and extends cylindrically or conically. The central bump 254 is constructed to receive the central cone extension 196 when the main filter element 154 is fully inserted within the housing interior 230. The recess 256 is constructed to engage the first extension arm 221 and provide contact between the recess 256 and the first extension arm 221. This contact that can extend annularly or circumferentially can help hold the safety filter element 156 in place.

The annular rim area 252 includes an annular rim periphery 258 and can include a series of exterior slots 260. The service cover 174 can be constructed to engage the slots 260 via bumps 280 on the service cover 174 to help hold the main filter element 154 in place to avoid rotation and vibration that might cause it to wear out.

The service cover 174 can be provided having an inner surface 282 that generally conforms to the closed end cap 250. In general, the inner surface 282 can include a projection 284 that fits within the recess 256, and can include a reverse cone 286 that receives the central bump 254. Furthermore, the inner surface 282 can include an annular rim 288 that surrounds the main filter element 154. The service cover 174 can be made of a plastic material and can be designed to guide, support, and push the safety element in place and participate to maintain the seal between the safety filter element 156 and the safety liner 180.

We claim:
1. An air cleaner assembly comprising:
 (a) an air cleaner housing comprising a main housing having: a housing interior, a first end with an air flow outlet; and, a second, open, end; and,
  (i) a collar positioned on the main housing and having the air flow outlet extending therethrough;
 (b) a service cover removably secured to the housing open end, the service cover comprising:
  (i) an inner surface including an annular rim; and;
  (ii) a plurality of bumps extending from the annular rim toward the housing interior; and,
 (c) a safety liner secured to, and extending from, the main housing first end toward the service cover;
  (i) the safety liner comprising: an open support structure; a closed end projecting toward the service cover; and, an open end opposite the closed end; and,

(ii) the safety liner including a plurality of projections having straight ends projecting from the open end of the safety liner into the collar at the air flow outlet;

(d) a main filter element located in the housing interior:
   (i) the main filter element comprising: a first open end cap, a second closed end cap, and a main filtration media extending from the first open end cap to the second closed end cap;
   (ii) a seal member located at the first open end cap; and
   (iii) the second closed end cap including an annular rim periphery and a plurality of slots in the annular rim periphery, and wherein the plurality of bumps on the service cover engage the plurality of slots in the annular rim periphery; and (e) the air cleaner housing including receivers positioned within the collar; each receiver comprising a pair of opposite sidewalls between which a straight end on one of the projections on the safety liner axially projects.

2. An air cleaner assembly according to claim 1 wherein:
(a) the collar is snap fit to a portion of the main housing.

3. An air cleaner assembly according to claim 1 wherein:
(a) the closed end of the safety liner includes a central cone extension surrounded by a shoulder area.

4. An air cleaner assembly according to claim 1 wherein:
(a) the seal member comprises an axial seal member.

5. An air cleaner assembly according to claim 1 including:
(a) a safety filter element removably positioned over the safety liner;
   (i) the safety filter element including filter media surrounding an interior.

6. An air cleaner assembly according to claim 5 wherein:
(a) an end of the safety filter opposite the air flow outlet includes an end piece with a central aperture therethrough.

7. An air cleaner assembly according to claim 1 wherein:
(a) the seal member on the main filter element comprises a radial seal member.

8. An air cleaner assembly according to claim 7 wherein:
(a) the radial seal member comprises an outwardly directed radial seal member.

9. An air cleaner assembly according to claim 1 wherein:
(a) the safety liner includes 4-8 projections projecting into the collar; and,
(b) the collar includes 4-8 receivers.

10. An air cleaner assembly according to claim 9 wherein:
(a) the collar is snap fit to a portion of the main housing.

11. An air cleaner assembly according to claim 10 wherein:
(a) the closed end of the safety liner includes a central cone extension surrounded by a shoulder area.

12. An air cleaner assembly according to claim 11 including:
(a) a safety filter element removably positioned over the safety liner;
   (i) the safety filter element including filter media surrounding an interior.

13. An air cleaner assembly according to claim 12 wherein:
(a) the safety filter includes a housing seal member positioned on an end of the safety filter positioned adjacent the air flow outlet end of the housing;
   (i) the housing seal member being removably sealed to a portion of the main housing.

14. An air cleaner assembly according to claim 13 wherein:
(a) the housing seal member is a radial seal.

15. An air cleaner assembly according to claim 12 wherein:
(a) an end of the safety filter opposite the air flow outlet includes an end piece with a central aperture therethrough.

16. An air cleaner assembly according to claim 15 wherein:
(a) the end piece of the end of the safety filter opposite the air flow outlet is molded-in-place with media of the safety filter embedded therein.

17. An air cleaner assembly according to claim 16 including:
(a) a main filter element removably positioned over the safety liner and safety filter;
the main filter element comprising:
   (i) first and second opposite ends, wherein the first end has an air flow exit aperture therethrough;
   (ii) an annular extension of filter media extending between the first and the second ends;
   (iii) a first, open, end cap adjacent the first end of the main filter element, the media being embedded in the first, open end cap, and the first, open end cap having a radial seal thereon; and,
   (iv) a second, closed, end cap adjacent the second end of the main filter element.

18. An air cleaner assembly according to claim 12 wherein:(a) the safety filter element includes a housing seal member positioned on an end of a filter media positioned adjacent the air flow outlet end of the housing; (i) the housing seal member being removably sealed to a portion of the main housing.

19. An air cleaner assembly according to claim 18 wherein:
(a) the housing seal member is a radial seal.

* * * * *